US011832347B2

(12) United States Patent
Gao

(10) Patent No.: US 11,832,347 B2
(45) Date of Patent: Nov. 28, 2023

(54) SUBSCRIPTION PROFILE DOWNLOADING METHOD, DEVICE, AND SERVER

(71) Applicant: Huawei Technologies Co., Ltd., Shenzhen (CN)

(72) Inventor: Linyi Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1170 days.

(21) Appl. No.: 16/477,767

(22) PCT Filed: Jan. 13, 2017

(86) PCT No.: PCT/CN2017/071185
§ 371 (c)(1),
(2) Date: Jul. 12, 2019

(87) PCT Pub. No.: WO2018/129724
PCT Pub. Date: Jul. 19, 2018

(65) Prior Publication Data
US 2019/0373448 A1    Dec. 5, 2019

(51) Int. Cl.
*H04W 8/20* (2009.01)
*H04L 9/40* (2022.01)
(Continued)

(52) U.S. Cl.
CPC ......... *H04W 8/205* (2013.01); *H04L 63/0823* (2013.01); *H04W 12/062* (2021.01); *H04W 12/069* (2021.01); *H04W 88/18* (2013.01)

(58) Field of Classification Search
CPC . H04W 8/205; H04W 12/062; H04W 12/069; H04W 88/18; H04W 12/35;
(Continued)

(56) References Cited

U.S. PATENT DOCUMENTS

2015/0121495 A1    4/2015  Gao et al.
2015/0180847 A1    6/2015  Nix
(Continued)

FOREIGN PATENT DOCUMENTS

CN    102523576 A    6/2012
CN    103731823 A    4/2014
(Continued)

OTHER PUBLICATIONS

Abu Shohel et al., "Security Analysis of the Consumer Remote SIM Provisioning Protocol," Nov. 29, 2022, pp. 1-33. (Year: 2022).*
(Continued)

*Primary Examiner* — Luu T Pham
*Assistant Examiner* — Canh Le
(74) *Attorney, Agent, or Firm* — Conley Rose, P.C.

(57) ABSTRACT

In a subscription profile downloading method when an application in a device triggers subscription profile downloading, an operator server sends, to a subscription management server, authentication information of an application allowed to initiate subscription profile downloading; and when receiving an authentication request sent by the device, the subscription management server uses the authentication information to attempt to authenticate the application initiating subscription profile downloading in the device, and provides subscription profile downloading for the device after the authentication succeeds. The subscription management server may add the authentication information to a subscription profile downloaded last time and send the subscription profile to the device, and when the device downloads a different subscription profile next time, the device may use the authentication information in the subscription profile downloaded last time to attempt to authenticate the application.

15 Claims, 22 Drawing Sheets

(51) Int. Cl.
*H04W 12/062* (2021.01)
*H04W 12/069* (2021.01)
*H04W 88/18* (2009.01)

(58) Field of Classification Search
CPC .... H04W 8/20; H04W 12/40; H04L 63/0823; H04L 9/006; H04L 9/3263; G06F 21/33
See application file for complete search history.

(56) References Cited

U.S. PATENT DOCUMENTS

| | | | | |
|---|---|---|---|---|
| 2016/0006728 A1* | 1/2016 | Park | ...................... | H04W 12/06 455/411 |
| 2016/0286380 A1 | 9/2016 | Long | | |
| 2017/0064552 A1* | 3/2017 | Park | ...................... | H04L 9/3273 |
| 2017/0142121 A1* | 5/2017 | Lee | ...................... | H04L 63/0853 |
| 2018/0123803 A1 | 5/2018 | Park et al. | | |
| 2018/0131699 A1 | 5/2018 | Park et al. | | |
| 2018/0176765 A1* | 6/2018 | Bharadwaj | ............ | H04W 8/183 |
| 2019/0098475 A1* | 3/2019 | Yang | ........................ | H04W 4/60 |
| 2019/0268757 A1* | 8/2019 | Yi | ......................... | H04W 60/00 |
| 2019/0294426 A1 | 9/2019 | Gao | | |
| 2020/0351656 A1* | 11/2020 | Johansson | ............... | H04W 4/70 |

FOREIGN PATENT DOCUMENTS

| | | |
|---|---|---|
| CN | 103974250 A | 8/2014 |
| CN | 104703170 A | 6/2015 |
| CN | 104703199 A | 6/2015 |
| EP | 3065431 A1 | 9/2016 |
| WO | 2015163623 A1 | 10/2015 |
| WO | 2016003200 A1 | 1/2016 |
| WO | 2016167551 A1 | 10/2016 |
| WO | 2016178548 A1 | 11/2016 |

OTHER PUBLICATIONS

Souha Nassour et al., "MNOs' Approaches for Building IoT Strategies," 2016, pp. 176-179 (Year: 2016).*
Penttinen, J., "Wireless Communications Security: Solutions for the Internet of Things," Wiley, Dec. 31, 2015, 26 pages.
Zhimin, D., et al., "Embedded UICC and its Remote Management Technology," Research and Development,—Aug. 15, 2012, 5 pages.
Machine Translation and Abstract of Chinese Publication No. CN103974250, dated Aug. 6, 2014, 42 pages.
"GlobalPlatform Device Technology, Device API Access Control," Version 0.4.0.1, Nov. 2016, 54 pages.
"GSMA RSP Architecture Version 1.0," XP055507651, Official Document SGP.21, Dec. 23, 2015, 52 pages.
"GSMA RSP Technical Specification Version 1.0," XP055429434, Official Document, SGP.22, Jan. 13, 2016, 114 pages.
Foreign Communication From A Counterpart Application, European Application No. 17890878.6, Extended European Search Report dated Sep. 11, 2019, 8 pages.
Foreign Communication From A Counterpart Application, PCT Application No. PCT/CN2017/071185, English Translation of International Search Report dated Sep. 20, 2017, 2 pages.
Foreign Communication From A Counterpart Application, PCT Application No. PCT/CN2017/071185, English Translation of Written Opinion dated Sep. 20, 2017, 6 pages.

* cited by examiner

SUBSCRIPTION PROFILE DOWNLOADING METHOD, DEVICE, AND SERVER

CROSS-REFERENCE TO RELATED APPLICATIONS

This application is a U.S. National Stage of International Patent Application No. PCT/CN2017/071185 filed on Jan. 13, 2017, which is hereby incorporated by reference in its entirety.

TECHNICAL FIELD

The present invention relates to the communications field, and in particular, to a subscription profile downloading method, a device, and a server.

BACKGROUND

At present, a terminal user purchases a SIM (Subscriber Identification Module, subscriber identification module) card or a UICC (Universal Integrated Circuit Card, universal integrated circuit card) from an operator, and inserts the SIM card or UICC into a device (device) to access a network of the operator based on a profile written into the card. An eUICC is a UICC that supports secure remote management of a subscription profile (profile) and/or a UICC that supports local management of a profile. The subscription profile is a data set of file structures, data, application programs, and the like on the eUICC.

The eUICC is usually integrated by a terminal manufacturer into a terminal device (that is, the device in this specification), and is usually not purchased and manufactured by the operator. Therefore, after the device is delivered from a factory, the eUICC probably does not include data that can be used to access the network of the operator. The device needs to use a remote management technology to connect to SM-DP+ (Subscription Manager Data Preparation+, subscription manager-data preparation entity), receives a profile delivered by the SM-DP+, and downloads the profile to the eUICC. Then the eUICC can use the profile to access the network of the operator. When the profile is active, a function of the eUICC is the same as that of a conventional UICC, and the eUICC can be used to access a network of a corresponding mobile network operator. The device further includes an LPA (Local Profile Assistant, local profile assistant) that is used to manage a profile in the eUICC, for example, download a new profile, activate a downloaded profile, deactivate a profile, and delete a profile.

Currently, the device can download a profile to the eUICC by using only the LPA.

SUMMARY

Embodiments of the present invention provide a subscription profile downloading method, a device, and a server, so as to use a current eUICC system architecture and access control mechanism to enable an application on a device to trigger an LPA to download a subscription profile and send the subscription profile to an eUICC.

According to an aspect of the present invention, a subscription profile downloading method is provided, the method is executed by a subscription management server, and the method includes: first, the subscription management server receives a profile order sent by an operator server, where the profile order includes authentication information of an application allowed by the operator server to initiate subscription profile downloading; then the subscription management server returns a profile order response message to the operator server based on the profile order; then the subscription management server receives an authentication request sent by a device, where the authentication request includes information about an application initiating subscription profile downloading in the device, and compares the authentication information and the information about the application initiating subscription profile downloading in the device, to attempt to authenticate the application initiating subscription profile downloading; and the subscription management server downloads the subscription profile for the device after the authentication succeeds.

With reference to the description in the first embodiment of the first aspect of the present invention, in a second embodiment, the authentication information includes a certificate or a hash value of the certificate of the application allowed by the operator server to initiate subscription profile downloading, and the information about the application initiating subscription profile downloading in the device includes a certificate or a hash value of the certificate of the application initiating subscription profile downloading in the device.

With reference to the description in the second embodiment of the first aspect of the present invention, in a third embodiment, the step of comparing the authentication information and the information about the application initiating subscription profile downloading in the device includes:

determining, through comparison, whether the certificate of the application allowed by the operator server to initiate subscription profile downloading is consistent with the certificate of the application initiating subscription profile downloading in the device, or determining, through comparison, whether the hash value of the certificate of the application allowed by the operator server to initiate subscription profile downloading is consistent with the hash value of the certificate of the application initiating subscription profile downloading in the device.

With reference to the description in the second embodiment or the third embodiment of the first aspect of the present invention, in a fourth embodiment, the authentication information further includes a package name of the application allowed by the operator server to initiate subscription profile downloading, and the information about the application initiating subscription profile downloading in the device further includes a package name of the application initiating subscription profile downloading in the device.

With reference to the description in the fourth embodiment of the first aspect of the present invention, in a fifth embodiment, the step of comparing the authentication information and the information about the application initiating subscription profile downloading in the device further includes:

determining, through comparison, whether the package name of the application allowed by the operator server to initiate subscription profile downloading is consistent with the package name of the application initiating subscription profile downloading in the device.

With reference to the description in any one of the first embodiment to the fifth embodiment of the first aspect of the present invention, in a sixth embodiment, the subscription management server includes a subscription manager-data preparation device and a subscription manager-discovery service device, and the method further includes: sending, by the subscription manager-data preparation device, an event registration request to the subscription manager-discovery service device based on the profile order, where the event registration request includes the authentication information; receiving, by the subscription manager-discovery service device, an event obtaining request sent by the device, where the event obtaining request includes the information about the application initiating subscription profile downloading in the device; comparing, by the subscription manager-discovery service device, the authentication information and the information about the application initiating subscription profile downloading in the device, to attempt to authenticate the application initiating subscription profile downloading; and returning, by the subscription manager-discovery service device, an event record to the device after the authentication succeeds.

With reference to the description in any one of the first embodiment to the sixth embodiment of the first aspect of the present invention, in a seventh embodiment, the profile order further includes EID information obtained by the operator server from the device, the EID information is ID information of an eUICC in the device, the authentication request further includes the EID, the profile order response message includes an address of the subscription management server and a query ID, and the query ID is a profile order matching ID or an event ID.

According to a second aspect of the present invention, a subscription profile downloading method is provided, the method is executed by an operator server, and the method includes: first, the operator server sends a profile order to a subscription management server, where the profile order includes authentication information of an application allowed by the operator server to initiate subscription profile downloading; then the operator server receives a profile order response message returned by the subscription management server based on the profile order; and then the operator server sends a trigger download message to the device based on the profile order response message.

With reference to the description in the first embodiment of the second aspect of the present invention, in a second embodiment, before the sending a profile order, the method further includes: sending a terminal information obtaining request to the device based on the download request; and receiving a terminal information response message returned by the device.

According to a third aspect of the present invention, a subscription profile downloading method is provided, the method is executed by a device, the device includes an eUICC, an LPA, and an application, and the method includes: triggering, by the application, the LPA to initiate subscription profile downloading; sending, by the LPA, an authentication request to a subscription management server, so that the subscription management server uses authentication information of an application allowed by the operator server to initiate subscription profile downloading, to attempt to authenticate the application that triggers the LPA to initiate subscription profile downloading, where the authentication request includes information about the application initiating subscription profile downloading in the device; and after the authentication performed by the subscription management server succeeds, downloading, by the LPA, the subscription profile, and sending the subscription profile to the eUICC.

With reference to the description in the first embodiment of the third aspect of the present invention, in a second embodiment, the step of triggering, by the application, the LPA to initiate subscription profile downloading includes: receiving a trigger download message sent by the operator server, and sending the trigger download message to the LPA to trigger the LPA to initiate subscription profile downloading.

With reference to the description in the first embodiment or the second embodiment of the third aspect of the present invention, in a third embodiment, before the triggering, by the application, the LPA to initiate subscription profile downloading, the method further includes: sending, by the application, a download request to the operator server, receiving a terminal information obtaining request sent by the operator server, and sending the terminal information obtaining request to the LPA; attempting, by the LPA or the eUICC, to authenticate the application; and after the authentication succeeds, generating, by the application, a terminal information response message, and sending the terminal information response message to the operator server, so that the operator server sends a profile order to the subscription management server.

With reference to the description in any one of the first embodiment to the third embodiment of the third aspect of the present invention, in a fourth embodiment, the step of attempting, by the LPA or the eUICC, to authenticate the application includes: obtaining, by the LPA, a certificate of the application, and sending the certificate to the eUICC; and attempting, by the eUICC, to authenticate the application based on preset certificate authentication information; or obtaining, by the LPA, a certificate of the application, and attempting to authenticate the application based on preset certificate authentication information.

With reference to the description in any one of the first embodiment to the fourth embodiment of the third aspect of the present invention, in a fifth embodiment, after the triggering, by the application, the LPA to initiate subscription profile downloading, the method further includes: sending, by the LPA, an event obtaining request to the subscription management server, so that the subscription management server attempts to authenticate the application initiating subscription profile downloading and returns an event record; and receiving, by the LPA, the event record returned by the subscription management server, where the event record is used by the LPA to send the authentication request to the subscription management server based on the event record.

According to a fourth aspect of the present invention, a method for performing subscription profile downloading on a device is provided, the device includes an eUICC, an LPA, and an application, and the method includes: downloading, by the eUICC, a first subscription profile from a subscription management server, where metadata information of the first subscription profile includes authentication information of an application allowed by the operator server to initiate subscription profile downloading; triggering, by the application, the LPA to initiate subscription profile downloading; attempting, by the LPA or the eUICC by using the authentication information, to authenticate the application that triggers the LPA to initiate subscription profile downloading, and after the authentication succeeds, downloading, by the LPA, a second subscription profile from the subscription management server, and sending the second subscription profile to the eUICC, where the second subscription profile is different from the first subscription profile.

With reference to the description in the first embodiment of the fourth aspect of the present invention, in a second embodiment, the step of attempting, by the LPA or the eUICC by using the authentication information, to authenticate the application that triggers the LPA to initiate subscription profile downloading includes: obtaining, by the LPA, the authentication information in the first subscription profile from the eUICC; and obtaining, by the LPA, information about the application initiating subscription profile downloading, and comparing the authentication information and the information about the application that triggers the LPA to initiate subscription profile downloading, to attempt to authenticate the application initiating subscription profile downloading.

With reference to the description in the first embodiment of the fourth aspect of the present invention, in a third embodiment, the step of attempting, by the LPA or the eUICC by using the authentication information in the first subscription profile, to authenticate the application that triggers the LPA to initiate subscription profile downloading includes: obtaining, by the LPA, information about the application initiating subscription profile downloading, and sending the information to the eUICC; and obtaining, by the eUICC, the authentication information from the metadata information of the first subscription profile, and comparing the authentication information and the information about the application that triggers the LPA to initiate subscription profile downloading, to attempt to authenticate the application initiating subscription profile downloading.

With reference to the description in the second embodiment or the third embodiment of the fourth aspect of the present invention, in a fourth embodiment, the authentication information includes a certificate or a hash value of the certificate of the application allowed by the operator server to initiate subscription profile downloading, and the information about the application that triggers the LPA to initiate subscription profile downloading includes a certificate or a hash value of the certificate of the application that triggers the LPA to initiate subscription profile downloading.

With reference to the description in any one of the first embodiment to the fourth embodiment of the fourth aspect of the present invention, in a fifth embodiment, before the triggering, by the application, the LPA to initiate subscription profile downloading, the method further includes: sending, by the application, a download request to the operator server, receiving a terminal information obtaining request sent by the operator server, and sending the terminal information obtaining request to the LPA; attempting, by the LPA or the eUICC, to authenticate the application; and after the authentication succeeds, generating, by the application, a terminal information response message, and sending the terminal information response message to the operator server.

With reference to the description in the fifth embodiment of the fourth aspect of the present invention, in a sixth embodiment, the step of attempting, by the LPA or the eUICC, to authenticate the application includes: obtaining, by the LPA, the certificate of the application, and sending the certificate to the eUICC; and attempting, by the eUICC, to authenticate the application based on preset certificate authentication information; or obtaining, by the LPA, the certificate of the application, and attempting to authenticate the application based on preset certificate authentication information.

With reference to the description in the fifth embodiment or the sixth embodiment of the fourth aspect of the present invention, in a seventh embodiment, the step of attempting, by the LPA or the eUICC, to authenticate the application further includes: attempting, by the LPA based on the terminal information obtaining request, to authenticate whether an EID obtained from the eUICC is the same as an EID in the terminal information obtaining request, where the EID is ID information of the eUICC.

According to a fifth aspect of the present invention, a method for performing subscription profile downloading on a device is provided, the device includes a first eUICC, a second eUICC, an LPA, and an application, and the method includes: downloading, by the first eUICC, a first subscription profile from a subscription management server, where metadata information of the first subscription profile includes authentication information of an application allowed by the operator server to initiate subscription profile downloading; triggering, by the application, the LPA to initiate subscription profile downloading; attempting, by the LPA or the first eUICC based on the authentication information, to authenticate the application that triggers the LPA to initiate subscription profile downloading; and after the authentication succeeds, downloading, by the LPA, a second subscription profile from the signature management device, and sending the second subscription profile to the second eUICC, where the second subscription profile is different from the first subscription profile.

With reference to the description in the first embodiment of the fifth aspect of the present invention, in a second embodiment, before the triggering, by the application, the LPA to initiate subscription profile downloading, the method further includes: sending, by the application, a download request to the operator server, receiving a terminal information obtaining request sent by the operator server, and sending the terminal information obtaining request to the LPA; attempting, by the LPA or the first eUICC, to authenticate the application; and after the authentication succeeds, obtaining, by the application, second eUICC information from the second eUICC, generating a terminal information response message based on the second eUICC information, and sending the terminal information response message to the operator server.

With reference to the description in the second embodiment of the fifth aspect of the present invention, in a third embodiment, the method further includes: after obtaining the terminal information obtaining request, sending, by the LPA, selection information to a display screen of the device, to display the second eUICC on the display screen so that a user selects the second eUICC to download the second subscription profile.

According to a sixth aspect of the present invention, a subscription management server that provides subscription profile downloading is provided, and the subscription management server includes: one or more processors, and a memory. The memory is configured to store a computer program. The processor is configured to run the computer program to execute the following procedure: wherein the one or more processors are configured to execute: receiving a profile order sent by an operator server, where the profile order includes authentication information of an application allowed by the operator server to initiate subscription profile downloading; returning a profile order response message to the operator server based on the profile order; receiving an authentication request sent by a device, where the authentication request includes information about an application initiating subscription profile downloading in the device, and comparing the authentication information and the information about the application initiating subscription profile downloading in the device, to attempt to authenticate the application initiating subscription profile downloading; and downloading the subscription profile for the device after the authentication succeeds.

With reference to the description in the second embodiment of the sixth aspect of the present invention, in a third embodiment, the authentication information includes a certificate or a hash value of the certificate of the application allowed by the operator server to initiate subscription profile downloading, and the information about the application initiating subscription profile downloading in the device includes a certificate or a hash value of the certificate of the application initiating subscription profile downloading in the device.

With reference to the description in the third embodiment of the sixth aspect of the present invention, in a fourth embodiment, the step of comparing the authentication information and the information about the application initiating subscription profile downloading in the device includes: determining, through comparison, whether the certificate of the application allowed by the operator server to initiate subscription profile downloading is consistent with the certificate of the application initiating subscription profile downloading in the device, or determining, through comparison, whether the hash value of the certificate of the application allowed by the operator server to initiate subscription profile downloading is consistent with the hash value of the certificate of the application initiating subscription profile downloading in the device.

With reference to the description in the third embodiment or the fourth embodiment of the sixth aspect of the present invention, in a fifth embodiment, the authentication information further includes a package name of the application allowed by the operator server to initiate subscription profile downloading, and the information about the application initiating subscription profile downloading in the device further includes a package name of the application initiating subscription profile downloading in the device.

With reference to the description in the fifth embodiment of the sixth aspect of the present invention, in a sixth embodiment, the step of comparing the authentication information and the information about the application initiating subscription profile downloading in the device further includes: determining, through comparison, whether the package name of the application allowed by the operator server to initiate subscription profile downloading is consistent with the package name of the application initiating subscription profile downloading in the device.

With reference to the description in any one of the first embodiment to the fifth embodiment of the sixth aspect of the present invention, in a sixth embodiment, the subscription management server includes a subscription manager-data preparation device and a subscription manager-discovery service device. The subscription manager-data preparation device is configured to send an event registration request to the subscription manager-discovery service device based on the profile order, where the event registration request includes the authentication information. The subscription manager-discovery service device is configured to: receive an event obtaining request sent by the device; compare the authentication information and the information that is in the event obtaining request and that is about the application initiating subscription profile downloading in the device, to attempt to authenticate the application initiating subscription profile downloading; and return an event record to the device after the authentication succeeds.

According to a seventh aspect of the present invention, an operator server that provides subscription profile downloading is provided. The operator server includes: one or more processors, and a memory. The memory is configured to store a computer program. The processor is configured to run the computer program to execute the following procedure: sending a profile order to a subscription management server, where the profile order includes authentication information of an application allowed by the operator server to initiate subscription profile downloading; receiving a profile order response message returned by the subscription management server based on the profile order; and sending a trigger download message to the device based on the profile order response message.

With reference to the description in the first embodiment of the sixth aspect of the present invention, in a second embodiment, before the sending a profile order, the processor further executes the following procedure: sending a terminal information obtaining request to the device based on the download request, and receiving a terminal information response message returned by the device.

According to an eighth aspect of the present invention, a subscription profile downloading device is provided, and the device includes an eUICC, an LPA, and an application. The application is configured to trigger the LPA to initiate subscription profile downloading. The LPA is configured to: send an authentication request to a subscription management server, so that the subscription management server uses authentication information of an application allowed by the operator server to initiate subscription profile downloading, to attempt to authenticate the application that triggers the LPA to initiate subscription profile downloading, where the authentication request includes information about the application initiating subscription profile downloading in the device; and after the authentication performed by the subscription management server succeeds, download the subscription profile from the subscription management server and send the subscription profile to the eUICC.

With reference to the description in the first embodiment of the eighth aspect of the present invention, in a second embodiment, the LPA is configured to: receive a trigger download message sent by the operator server, and send the trigger download message to the LPA to trigger the LPA to initiate subscription profile downloading.

With reference to the description in the first embodiment or the second embodiment of the eighth aspect of the present invention, in a third embodiment, the application is further configured to: before triggering the LPA to initiate subscription profile downloading, send a download request to the operator server, receive a terminal information obtaining request sent by the operator server, and send the terminal information obtaining request to the LPA; after the LPA or the eUICC attempts to authenticate the application and the authentication succeeds, generate a terminal information response message, and send the terminal information response message to the operator server, so that the operator server sends a profile order to the subscription management server; and the LPA is configured to attempt to authenticate the application, or the eUICC is configured to attempt to authenticate the application.

With reference to the description in the third embodiment of the eighth aspect of the present invention, in a fourth embodiment, the LPA is configured to obtain a certificate of the application and send the certificate to the eUICC; and the eUICC is configured to attempt to authenticate the application based on preset certificate authentication information.

With reference to the description in the third embodiment of the eighth aspect of the present invention, in a fifth embodiment, the LPA is configured to: obtain a certificate of the application, and attempt to authenticate the application based on preset certificate authentication information.

With reference to the description in any one of the third embodiment to the fifth embodiment of the eighth aspect of the present invention, in a sixth embodiment, the LPA is configured to: after the application triggers the LPA to initiate subscription profile downloading, send an event obtaining request to the subscription management server, so that the subscription management server attempts to authenticate the application initiating subscription profile downloading and returns an event record; and receive the event record returned by the subscription management server, where the event record is used by the LPA to send the authentication request to the subscription management server based on the event record.

According to a ninth aspect of the present invention, a device for performing subscription profile downloading on a device is provided, and the device includes an eUICC, an LPA, and an application. The eUICC is configured to download a first subscription profile from a subscription management server, where metadata information of the first subscription profile includes authentication information of an application allowed by the operator server to initiate subscription profile downloading: the application is configured to trigger the LPA to initiate subscription profile downloading: the LPA is configured to attempt, by using the authentication information, to authenticate the application that triggers the LPA to initiate subscription profile downloading; or the eUICC is configured to attempt, by using the authentication information, to authenticate the application that triggers the LPA to initiate subscription profile downloading; and the LPA is further configured to: after the authentication succeeds, download a second subscription profile from the subscription management server, and send the second subscription profile to the eUICC, where the second subscription profile is different from the first subscription profile.

With reference to the description in the first embodiment of the ninth aspect of the present invention, in a second embodiment, the LPA is configured to: obtain the authentication information in the first subscription profile from the eUICC, obtain information about the application initiating subscription profile downloading, and compare the authentication information and the information about the application that triggers the LPA to initiate subscription profile downloading, to attempt to authenticate the application initiating subscription profile downloading.

With reference to the description in the second embodiment of the ninth aspect of the present invention, in a third embodiment, the LPA is configured to: obtain information about the application initiating subscription profile downloading, and send the information to the eUICC; and the eUICC is configured to: obtain the authentication information from the metadata information of the first subscription profile, and compare the authentication information and the information about the application that triggers the LPA to initiate subscription profile downloading, to attempt to authenticate the application initiating subscription profile downloading.

With reference to the description in the second embodiment or the third embodiment of the ninth aspect of the present invention, in a fourth embodiment, the authentication information includes a certificate or a hash value of the certificate of the application allowed by the operator server to initiate subscription profile downloading, and the information about the application that triggers the LPA to initiate subscription profile downloading includes a certificate or a hash value of the certificate of the application that triggers the LPA to initiate subscription profile downloading.

With reference to the description in the first embodiment or the fourth embodiment of the ninth aspect of the present invention, in a fifth embodiment, the application is configured to: send a download request to the operator server, receive a terminal information obtaining request sent by the operator server, and send the terminal information obtaining request to the LPA; the LPA is configured to attempt to authenticate the application, or the eUICC is configured to attempt to authenticate the application; and the application is configured to: after the authentication succeeds, generate a terminal information response message, and send the terminal information response message to the operator server.

With reference to the description in the fifth embodiment of the ninth aspect of the present invention, in a sixth embodiment, the LPA is configured to obtain the certificate of the application and send the certificate to the eUICC; and the eUICC is configured to attempt to authenticate the application based on preset certificate authentication information.

With reference to the description in the fifth embodiment of the ninth aspect of the present invention, in a seventh embodiment, the LPA is configured to: obtain the certificate of the application, and attempt to authenticate the application based on preset certificate authentication information.

With reference to the description in the sixth embodiment or the seventh embodiment of the ninth aspect of the present invention, in an eighth embodiment, the LPA is further configured to attempt, based on the terminal information obtaining request, to authenticate whether an EID obtained from the eUICC is the same as an EID in the terminal information obtaining request, where the EID is ID information of the eUICC.

According to a tenth aspect of the present invention, a subscription profile downloading device is provided, and the device includes a first eUICC, a second eUICC, an LPA, and an application. The first eUICC is configured to download a first subscription profile from a subscription management server, where metadata information of the first subscription profile includes authentication information of an application allowed by the operator server to initiate subscription profile downloading. The application is configured to trigger the LPA to initiate subscription profile downloading. The LPA is configured to attempt, based on the authentication information, to authenticate the application that triggers the LPA to initiate subscription profile downloading; or the first eUICC is configured to attempt, based on the authentication information, to authenticate the application that triggers the LPA to initiate subscription profile downloading; The LPA is further configured to: after the authentication succeeds, download a second subscription profile from the signature management device, and send the second subscription profile to the second eUICC, where the second subscription profile is different from the first subscription profile.

With reference to the description in the first embodiment of the tenth aspect of the present invention, in a second embodiment, the application is configured to: before the application triggers the LPA to initiate subscription profile downloading, send a download request to the operator server, receive a terminal information obtaining request sent by the operator server, and send the terminal information obtaining request to the LPA; the LPA is configured to attempt to authenticate the application, or the first eUICC is configured to attempt to authenticate the application; and the application is further configured to: after the authentication succeeds, obtain second eUICC information from the second eUICC, generate a terminal information response message based on the second eUICC information, and send the terminal information response message to the operator server.

With reference to the description in the first embodiment or the second embodiment of the tenth aspect of the present invention, in a third embodiment, the LPA is further configured to: after obtaining the terminal information obtaining request, send selection information to a display screen of the device, to display the second eUICC on the display screen so that a user selects the second eUICC to download the second subscription profile.

According to an eleventh aspect of the present invention, a method for implementing subscription profile downloading in a system is provided, and the system includes a subscription management server, an operator server, and a device. An application in the device sends a download request to the operator server. The operator server sends a profile order to the subscription management server, where the profile order includes access control information of an application in a device that is stored in the operator server. The subscription management server processes the profile order, and returns a response message to the operator server. The operator server sends a trigger download message to the device based on the response message. An LPA in the device sends an authentication request to the subscription management server. The subscription management server attempts, by using the access control information, to authenticate an access permission of the application initiating the download request. The device downloads a subscription profile after the authentication succeeds.

According to a twelfth aspect of the present invention, a system for implementing subscription profile downloading is provided, and the system includes a subscription management server, an operator server, and a device. The subscription management server is configured to: receive a profile order sent by the operator server, where the profile order includes access control information of an application that is in the device and that initiates a download request; process the profile order, and return a profile order response message to the operator server to trigger downloading; when receiving an authentication request sent by the device, attempt, by using the access control information, to authenticate an access permission of the application initiating the download request; and download a subscription profile for the device after the authentication succeeds. The operator server is configured to: receive a download request sent by the device; send a profile order to the subscription management server, where the profile order includes access control information of an application in a device that is stored in the operator server; receive a response message returned by the subscription management server after the subscription management server processes the profile order; and send a trigger download message to the device based on the response message, to trigger downloading. The device includes an application, an LPA, and an eUICC. The device is configured to: the application sends a download request to the operator server, so that the operator server sends a profile order to the subscription management server, where the profile order includes access control information of an application in a device that is stored in the operator server; the application receives a trigger download message sent by the operator server, and triggers the LPA to perform downloading; the LPA sends an authentication request to the subscription management server, so that the subscription management server attempts, by using the access control information, to authenticate an access permission of the application initiating the download request; and after the authentication succeeds, the LPA downloads a subscription profile and sends the subscription profile to the eUICC.

In conclusion, the embodiments of the present invention provide a subscription profile downloading method, a device, and a server. In the method, when the application in the device triggers subscription profile downloading, the operator server sends, to the subscription management server, the authentication information of the application allowed to initiate subscription profile downloading; and when receiving an authentication request sent by the device, the subscription management server uses the authentication information to attempt to authenticate the application initiating subscription profile downloading in the device, and provides subscription profile downloading for the device after the authentication succeeds. In another embodiment, the subscription management server may add the authentication information to a subscription profile downloaded last time and send the subscription profile to the device, and when the device downloads a different subscription profile next time, the device may use the authentication information in the subscription profile downloaded last time to attempt to authenticate the application, so as to use a current eUICC system architecture and access control mechanism to enable an application on a device to trigger an LPA to download a subscription profile and send the subscription profile to an eUICC.

DESCRIPTION OF EMBODIMENTS

Figure 1:
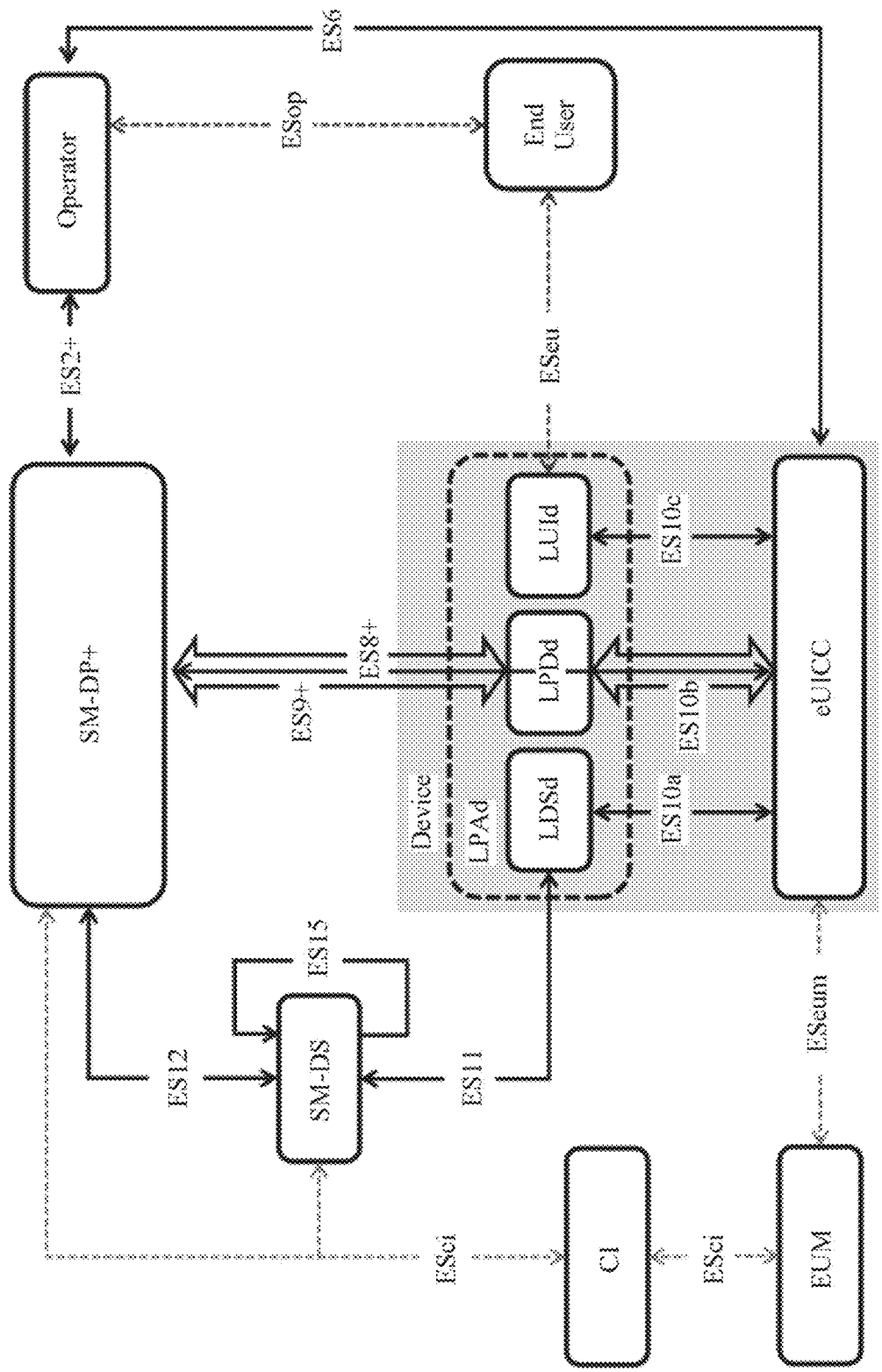
FIG. 1 is an architectural diagram of an eUICC remote management system according to an embodiment of the present invention.

An existing SIM card or UICC card is usually ordered by an MNO (mobile network operator, mobile network operator) from a card provider. Therefore, a network access application and data, such as a USIM (Universal Subscriber Identity Module, universal subscriber identity module), an IMSI (International Mobile Subscriber Identity, international mobile subscriber identity), and a KI (Key Identity, key identity), that are required for accessing an operator network are already downloaded to the card before the card is delivered from a factory. In this way, a user can access the operator network after purchasing a SIM card or a UICC card and inserting the SIM card or the UICC card into a device (device).

Different from the UICC card, an eUICC is usually embedded into the device. The eUICC is not necessarily purchased by the operator from the card provider. The eUICC may be purchased by a device manufacturer and then is integrated into the device. Therefore, after being delivered from the factory, the eUICC may not include data that can be used to connect to the operator network. The data such as a profile (a profile is a set of data and application programs configured in the eUICC to provide services) needs to be downloaded remotely. Then, the operator network can be accessed based on the data.

The following two technical solutions are provided in the embodiments of the present invention to download a profile by using an application installed in the device (such as an application that is installed on a mobile phone and that is provided by an operator, that is, an MNO APP, or a third-party application).

1. After an MNO portal receives download trigger information by using other means (for example, the download trigger information is received by an operator service device and provided by a user by using a customer service phone call or other means), when the MNO portal sends a profile download request to an SM-DP+, access control information of the MNO APP for an LPA API/eUICC/profile, that is, authentication information for the APP, is carried in the download request and is sent to the SM-DP+. If the SM-DP+ registers a profile download event in an SM-DS, the access control information of the MNO APP for the LPA API/eUICC/profile is carried in the registration event request and is sent to the SM-DS. When the device sends an identity authentication request to the SM-DP+ or sends an event obtaining request to the SM-DS (the event obtaining request may also be an identity authentication request, for example, sending an authenticate client (AuthenticateClient) message to request authentication and obtain an event record from the SM-DS), the SM-DP+/SM-DS attempts to authenticate an access permission of the MNO APP, and downloads the profile after the permission authentication succeeds.

2. Access control of the device on the MNO APP depends on a profile of the operator that has been downloaded on the current device. To be specific, the MNO adds access control information of the MNO APP for an LPA API/eUICC/profile to profile metadata, the access control information and the profile are downloaded to the eUICC together, and when the MNO APP invokes the LPA API to download a new profile, the LPA or the eUICC uses the existing profile of the same operator to attempt to authenticate an access permission of the APP, so as to perform access control.

First, the system and terms involved in the embodiments of the present invention are described in the following.

1. As shown in FIG. 1, FIG. 1 is an architectural diagram of an eUICC remote management system according to an embodiment of the present invention. Referring to FIG. 1, the system includes an SM-DP+(Subscription Manager Data Preparation+, subscription manager-data preparation) server, an SM-DS (Subscription Manager-Discovery Server, subscription manager-discovery server), an operator (Operator) server, a card provider (EUM), a certificate issuer CI (Certificate Issuer), and a device (Device).

In addition, interfaces between various entities are introduced: ES6 is an interface between the eUICC and the operator; ES2+ is an interface between the operator and the SM-DP+; ES8+ is an interface between the eUICC and the SM-DP+; ES11 is an interface between an LDS (local discovery service, local discovery service) of the device and the SM-DS; ES12 is an interface between the SM-DS and the SM-DP+; ES10a is an interface between the LDS and the eUICC; ES10c is an interface between an LUI (local user interface, local user interface) and the eUICC; ESci is an interface between the EUM and the CI, or an interface between the CI and the SM-DP+; ESeum is an interface between the EUM and the eUICC; ESo is an interface for interaction between an end user (End User) and the operator; ESeu is an interface between the end user and the LUI; ES9+ is an interface between the SM-DP+ and LPD (local profile download, local profile download); and ES10b is an interface between the LPD and the eUICC.

Functions of the SM-DP+ include generation of a subscription profile (profile), protection of a subscription profile (for example, encryption), storage of a subscription profile, and binding of a subscription profile (for example, binding a profile and an event (event) ID), transmission of a subscription profile, management of a subscription profile, SM-DS event registration, and the like. The SM-DS is mainly responsible for accepting event (event) registration sent by the SM-DP+ and sending the event to the device. The event includes a subscription profile download event or a subscription profile management event. The device downloads a subscription profile from the SM-DP+ based on the subscription profile download event.

Depending on deployment of the operator, in some embodiments, a subscription management server includes only an SM-DP+, and in some embodiments, the subscription management server includes at least one SM-DP+ and at least one SM-DS. The SM-DP+ and the SM-DS may be deployed by the operator. In some embodiments, the SM-DP+ is deployed by an operator, and the SM-DS is deployed by a unified organization, such as an organization of the operator.

Further, referring to FIG. 1, the device includes an LPA and the eUICC, and the LPA includes the LDS, the LPD, and the LUI. In a specific implementation, the LDS of the device queries the SM-DS for an event, and the LPD is responsible for downloading a subscription profile. To be specific, the LPD downloads a profile from the SM-DP+ to the LPD by using an HTTPS (Hypertext Transfer Protocol Secure, Hypertext Transfer Protocol Secure) link, and then sends the downloaded subscription profile to the eUICC by using a local APDU command. The subscription profile herein refers to a set of file structures, data, application programs, and the like, and may include one or more network access applications and corresponding network access credentials. It should be noted that, in the embodiment of the present invention, the subscription profile is a general term, and includes a subscription profile installed on the eUICC of the device and a profile package stored in the SM-DP+.

In addition, the LUI of the device provides logic and an interface for interaction with the user. The user can manage a profile by using the LUI, such as download a new profile, activate a profile, deactivate a profile, and delete a profile.

FIG. 2A to FIG. 8C are schematic flowcharts of subscription profile downloading methods according to some embodiments of the present invention. In the signal flow diagrams of the accompanying drawings, if a parameter carried by transmitted information is enclosed by "[ ]" (for example, "[device info]" in a transmitted terminal information response message in step 8 shown in FIG. 2A), it indicates that the parameter is an optional parameter. For details, refer to the description of each embodiment.

With reference to the above, an embodiment of the present invention provides a method for providing subscription profile downloading on a subscription management server. The method includes steps 101 to 104.

In step 101, the subscription management server receives a profile order sent by an operator server, where the profile order includes authentication information of an application allowed by the operator server to initiate subscription profile downloading.

The profile order (the profile order is a general term of profile orders such as a download order and a confirm order) may be sent by the operator server based on a download request initiated by an application in the device; or may be sent based on download trigger information received by using other means (for example, the download trigger information is received by the operator server and provided by a user by using a customer service phone call or other means), or may be sent by the operator server based on a received terminal information response message returned by the application after the operator server sends a terminal information obtaining request to the application.

The profile order includes authentication information of the application allowed by the operator server to initiate subscription profile downloading.

In some embodiments, the authentication information may include a certificate or a hash value of the certificate of the application allowed by the operator server to initiate subscription profile downloading. The authentication information may be pre-stored by the operator server, or may be obtained by the operator server from another authentication device. Compared with directly transmitting the certificate, the hash value of the certificate has a small data amount and is more convenient to be sent. In some embodiments, the authentication information may further include a package name of the application allowed by the operator server to initiate subscription profile downloading.

The profile order may further include an EID (eUICC ID information) provided by the eUICC. The EID may be bound to a corresponding subscription profile when the subscription management server performs event registration, and may be corresponding to an event record obtained during event registration.

Optionally, the profile order may further include a package name of the application allowed by the operator server to initiate subscription profile downloading. In addition, optionally, the profile order may further include a hash algorithm (hash algorithm) used for calculating a hash value of a signature certificate, and a signature certificate or a hash value of the signature certificate of the application in the profile order. Optionally, the package name of the application and the hash algorithm may be pre-configured on the operator server, or may be obtained by the operator server from a server that is related to the operator server and that can provide access control information.

If a download event needs to be registered to an SM-DS of the operator server, the profile order may further include an SM-DS address provided by the operator server. In step 102, a profile order response message is returned to the operator server based on the profile order, where the profile order response message includes an address of the subscription management server and a query ID, and the query ID is a profile order matching ID or an event ID.

In some embodiments, the subscription management server includes an SM-DP+(subscription manager-data preparation device). The SM-DP+ generates a corresponding subscription profile (profile) based on the profile order, and returns the profile order response message. The profile order response message includes an address of the SM-DP+ and the profile order matching ID (matching ID). Then the subscription management server returns the profile order response message to the operator server, where the profile order response message includes the address of the SM-DP+ and the profile order matching ID.

In some embodiments, if the subscription management server includes an SM-DP+(subscription manager-data preparation device) and an SM-DS (subscription manager-discovery service device), in step 102, the subscription manager-data preparation device sends an event registration request to the subscription manager-discovery service device based on the profile order, to register an event. The event registration request includes the authentication information. The SM-DP+ generates an event ID (event ID) based on the profile order, and sends the event registration request to the SM-DS. The event registration request includes the authentication information (such as the certificate or the hash value of the certificate of the application allowed by the operator server to initiate subscription profile downloading). The event registration request may further include the event ID. If the profile order includes the EID, the hash algorithm, and the package name of the application allowed to initiate subscription profile downloading, the event registration request further includes the EID, the hash algorithm, and the package name of the application allowed to initiate subscription profile downloading that are obtained from the profile order. After the event is registered, the subscription management server returns the profile order response message to the operator server. The profile order response message includes an address of the SM-DS in the subscription management server and the event ID or the profile order matching ID.

In some embodiments, the subscription management server includes an SM-DP+ and an SM-DS, and the subscription management server has registered an event. Before sending an authentication request, the device sends an event obtaining request to the SM-DS, and the SM-DS performs authentication based on the event obtaining request, and returns an event record after the authentication succeeds.

Specifically, the method further includes step 105, step 106, and step 107.

In step 105, the subscription manager-discovery service device receives the event obtaining request sent by the device.

The event obtaining request includes information about an application initiating subscription profile downloading in the device. The information about the application initiating subscription profile downloading in the device may include a certificate or a hash value of the certificate of the application initiating subscription profile downloading in the device. The information about the application initiating subscription profile downloading in the device may further include a package name of the application initiating subscription profile downloading in the device.

The event obtaining request may further include the EID obtained from the device. When the profile order response message includes the event ID, the event obtaining request may further include the event ID. When the profile order response message includes the profile order matching ID, the event obtaining request may further include the profile order matching ID or the event ID that is the same as or corresponding to the profile order matching ID. In addition, the event obtaining request may further include the package name of the application initiating subscription profile downloading in the device.

In some embodiments, the event obtaining request may also be an identity authentication request, for example, sending an authenticate client (Authenticate Client) request to request authentication and obtain the event record from the SM-DS.

Then the subscription manager-discovery service device obtains, from the event obtaining request, the information about the application initiating subscription profile downloading in the device, searches for the corresponding event registration request based on the EID, and the event ID or the profile order matching ID in the event obtaining request, and obtains the authentication information from the event.

Then in step 106, the subscription manager-discovery service device attempts to authenticate the application.

When the authentication information includes the certificate of the application allowed by the operator server to initiate subscription profile downloading, and the information about the application initiating subscription profile downloading in the device includes the certificate of the application initiating subscription profile downloading in the device, the subscription manager-discovery service device compares the certificate of the application allowed by the operator server to initiate subscription profile downloading and the certificate of the application initiating subscription profile downloading in the device. Alternatively, when the authentication information includes the hash value of the certificate of the application allowed by the operator server to initiate subscription profile downloading, and the information about the application initiating subscription profile downloading in the device includes the hash value of the certificate of the application initiating subscription profile downloading in the device, the subscription manager-discovery service device compares the hash value of the certificate of the application allowed by the operator server to initiate subscription profile downloading and the hash value of the certificate of the application initiating subscription profile downloading in the device. Alternatively, when the authentication information includes the hash value of the certificate of the application allowed by the operator server to initiate subscription profile downloading, and the information about the application initiating subscription profile downloading in the device includes the certificate of the application initiating subscription profile downloading in the device, the subscription manager-discovery service device calculates, by using the hash algorithm, the hash value of the certificate of the application initiating subscription profile downloading in the device, and compares the hash value of the certificate of the application allowed by the operator server to initiate subscription profile downloading and the hash value of the certificate of the application initiating subscription profile downloading in the device.

When the authentication information further includes the package name of the application allowed by the operator server to initiate subscription profile downloading, and the information about the application initiating subscription profile downloading in the device further includes the package name of the application initiating subscription profile downloading in the device, the subscription manager-discovery service device may further compare the package name of the application allowed by the operator server to initiate subscription profile downloading and the package name of the application initiating subscription profile downloading in the device, to further attempt to authenticate the application.

In step 106, the subscription manager-discovery service device compares the authentication information and the information about the application initiating subscription profile downloading in the device, to attempt to authenticate the application initiating subscription profile downloading.

Then in step 107, the subscription manager-discovery service device returns the event record to the device after the authentication succeeds.

The event record includes the address of the SM-DP+ and the profile order matching ID. The profile order matching ID may be the same as the event ID.

Then in step 103, the subscription management server receives the authentication request sent by the device, obtains the information about the application initiating subscription profile downloading in the device from the authentication request, and compares the authentication information and the information about the application initiating subscription profile downloading in the device, to attempt to authenticate the application initiating subscription profile downloading.

The device sends the authentication request to the subscription management server to initiate downloading. The authentication request (that is, the authenticate client request) includes the information about the application initiating subscription profile downloading in the device, and the information about the application initiating subscription profile downloading in the device includes the certificate or the hash value of the certificate of the application initiating subscription profile downloading in the device. Refer to step 105 in the foregoing embodiment. For brevity, details are not described again.

The authentication request further includes the profile order matching ID in the profile order response message or the profile order matching ID in the event record (which is selected when a download event has been registered), and the EID obtained from the device. Optionally, the authentication request may further include the package name of the application that is obtained from the device.

In some embodiments, when the subscription management server receives the authentication request sent by the device, the subscription management server obtains, from the authentication request, the information about the application initiating subscription profile downloading in the device, searches for the corresponding profile order based on the profile order matching ID, obtains the authentication information in the profile order, and compares the authentication information and the information about the application initiating subscription profile downloading in the device, to attempt to authenticate the application initiating subscription profile downloading.

The comparing the authentication information and the information about the application initiating subscription profile downloading in the device includes comparing certificates or hash values of the certificates, and may further include comparing package names of the applications, to attempt to authenticate the application initiating subscription profile downloading. For an authentication process, refer to the comparison process in step 106 in the foregoing embodiment. For brevity, details are not described again.

In step 104, after the authentication in step 103 succeeds, the subscription management server downloads the subscription profile for the device. In some embodiments, the SM-DP+ in the subscription management server prepares the subscription profile, and after the authentication in step 103 succeeds, the device is allowed to download the subscription profile.

An embodiment of the present invention provides a method for providing subscription profile downloading on an operator server. The method includes steps 201 to 204.

In step 201, the operator server sends a profile order to a subscription management server, where the profile order includes authentication information of an application allowed by the operator server to initiate subscription profile downloading.

For the profile order and the authentication information, refer to the description of step 101 , step 102, step 103, and step 105 in the foregoing embodiment. For brevity, details are not described again.

In some embodiments, before step 201, the method further includes step 205 and step 206.

In step 205, the operator server sends a terminal information obtaining request to the device based on the download request.

In step 206, the operator server receives a terminal information response message returned by the device.

The terminal information response message includes eUICC information (eUICC info), and optionally further includes an EID and device information (device info). The operator server generates the corresponding profile order based on the terminal information response message.

The eUICC information may include a profile package version (Profile Package Version), a specification version number (SVN: Specification Version Number), a firmware version (Firmware version), an available amount of non-volatile memory (Available amount of non-volatile memory), UICC capabilities (UICC capabilities), a supported Java card version (Java card version), a supported GlobalPlatform version (GlobalPlatform version), RSP capabilities (RSP capabilities), and the like.

The device information may include device type allocation code (Device type allocation code), device capabilities (The Device SHALL set all the capabilities it supports), radio access technologies including release (Radio access technologies, including release), contactless communication capabilities (Contactless), an optional RSP feature, an international mobile equipment identity (IMEI), and the like.

The operator server determines, based on the eUICC info, a type (profile type) of a profile that should be ordered from an SM-DP+, for example, determines, based on the specification version number, eUICC capabilities, and the like in the eUICC info, the type of the profile that needs to be ordered. If the terminal information response message includes the device info, the device info may be used to determine a type of a profile to be ordered from the SM-DP+, for example, determine, based on radio access capabilities in the device info, the type of the profile that needs to be ordered. The device info can help order a more accurate type of profile.

In step 202, the operator server receives a profile order response message returned by the subscription management server based on the profile order.

For the profile order response message, refer to the description of step 102, step 103, and step 105 in the foregoing embodiment. For brevity, details are not described again.

In step 204, the operator server sends a trigger download message to the device based on the profile order response message.

The trigger download message includes an address of the SM-DP+ or an address of an SM-DS, and a profile order matching ID (matching ID) or an event ID (event ID).

In some embodiments, the subscription management server includes the SM-DP+, and the trigger download message includes the address of the SM-DP+ and the profile order matching ID.

In some embodiments, the subscription management server includes the SM-DP+ and the SM-DS, and the trigger download message includes the address of the SM-DS and the event ID.

For the profile order matching ID and the event ID, refer to the description of step 102, step 103, step 105, and step 106 in the foregoing embodiment. For brevity, details are not described again.

An embodiment of the present invention provides a method for performing subscription profile downloading on a device. The device includes an eUICC, an LPA, and an application. The method includes step 301 to step 303.

In step 301, the application triggers the LPA to initiate subscription profile downloading.

In some embodiments, in step 301, the application receives a trigger download message sent by the operator server, and sends the trigger download message to the LPA to trigger the LPA to initiate subscription profile downloading.

For the trigger download message, refer to the description of step 204 in the foregoing embodiment. For brevity, details are not described again.

In some embodiments, the application may not send a download request, the operator server obtains related request information from another channel, and after the application logs in to the operator server based on user information, the operator server actively sends a terminal information obtaining request, and prepares the corresponding subscription profile based on an obtained terminal information response message.

In some embodiments, the device sends a download request to the operator server by using the application, and receives a terminal information obtaining request sent by the operator server; then the LPA or the eUICC attempts to authenticate an identity of the application, for example, attempts to authenticate information about a root certificate of a signature certificate of the application, for example, whether the root certificate of a certificate chain for the certificate of the application is a GSMA CI certificate; and after the authentication succeeds, the device returns a terminal information response message. With reference to the above, before step 301, the method further includes step 304 to step 306.

In step 304, the application sends the download request to the operator server, receives the terminal information obtaining request sent by the operator server and sends the terminal information obtaining request to the LPA.

In step 305, the LPA or the eUICC attempts to authenticate the application.

In step 305, the authentication may be performed by the LPA. Specifically, the LPA obtains a certificate of the application, and sends the certificate to the eUICC; and the eUICC attempts to authenticate the application based on preset certificate authentication information.

Alternatively, the authentication may be performed by the LPA. Specifically, the LPA obtains a certificate of the application, and attempts to authenticate the application based on preset certificate authentication information.

The LPA may obtain the certificate of the application from a device OS (an operating system on the terminal, such as an IOS system or an Android system), and attempt to authenticate root certificate information of the certificate. For example, the LPA may obtain the certificate from the operating system of the terminal to attempt to authenticate whether a root certificate of the certificate is a GMSA CI certificate, that is, attempt to authenticate whether the certificate of the application is a valid certificate issued by the GSMA CI to an operator.

In step 306, after the authentication in step 305 succeeds, the application generates the terminal information response message, and sends the terminal information response message to the operator server, so that the operator server sends a profile order to the subscription management server.

After the authentication in step 305 succeeds, the LPA obtains eUICC information from the eUICC, and sends the eUICC information to the application. Optionally, the LPA further obtains an EID from the eUICC. The EID may be carried when the terminal information response message is sent in a subsequent step.

For the terminal information response message, refer to the description of step 206 in the foregoing embodiment. For brevity, details are not described again.

In some embodiments, if the subscription management server includes an SM-DP+ and an SM-DS, the subscription management server registers a download event, and before step 302, the method optionally further includes step 307 and step 308.

In step 307, before a step of sending an authentication request to the subscription management server, the LPA sends an event obtaining request to the subscription management server, so that the subscription management server attempts to authenticate the application initiating subscription profile downloading and returns an event record. In step 308, the LPA receives the event record sent by the subscription management server based on the event obtaining request, where the event record is used by the LPA to send the authentication request to the subscription management server based on the event record.

Refer to the description of step 105 in the foregoing embodiment for the event obtaining request, and refer to the description of step 106 in the foregoing embodiment for the event record. For brevity, details are not described again.

Then in step 302, the LPA sends the authentication request to the subscription management server, so that the subscription management server uses authentication information of an application allowed by the operator server to initiate subscription profile downloading, to attempt to authenticate the application, where the authentication request includes information about the application initiating subscription profile downloading in the device.

Then in step 303, the LPA sends the authentication request to the subscription management server, so that the subscription management server searches for the corresponding profile order as described in step 103 in the foregoing embodiment, obtains the authentication information in the profile order, and attempts, by using the authentication information of the application allowed by the operator server to initiate subscription profile downloading, to authenticate the application that triggers the LPA to initiate subscription profile downloading; and after an access permission of the application in the device initiating the authentication request has been authenticated, the LPA downloads the subscription profile and sends the subscription profile to the eUICC.

For the authentication request, the authentication information, and the information about the application initiating subscription profile downloading in the device, refer to the description of step 101, step 104, step 105, and step 107 in the foregoing embodiment. For brevity, details are not described again.

Then in step 303, after the authentication performed by the subscription management server succeeds, the LPA downloads the subscription profile and sends the subscription profile to the eUICC.

An embodiment of the present invention provides a method for performing subscription profile downloading on a device. The method is executed by the device. The device may be a terminal. The device includes an eUICC, an LPA, and an application. In this embodiment, when there is already a subscription profile downloaded from the subscription management server, and the device needs to download a new subscription profile from the subscription management server, the device may obtain authentication information from metadata information of the previously downloaded subscription profile, and attempt, on the device side by using the authentication information, to authenticate the application initiating a download request. The method includes step 401 to step 404.

In step 401, the eUICC downloads a first subscription profile from a subscription management server, where metadata information of the first subscription profile includes authentication information of an application allowed by the operator server to initiate subscription profile downloading.

Herein step 401 may be understood as: the eUICC of the device has downloaded a subscription profile (that is, the first subscription profile), and in a downloading process, the operator server adds access control information to the metadata information such as metadata (metadata) of the first subscription profile.

The first subscription profile information may further include a hash algorithm used for calculating a hash value of an application signature certificate, and may further include an allowed API (allowed application access interface).

The authentication information includes a subscription certificate or a hash value of the subscription certificate of the application allowed by the operator server to initiate subscription profile downloading. In addition, the authentication information may further include a package name of the application allowed by the operator server to initiate subscription profile downloading. For details, refer to the description of step 101, step 102, step 103, and step 105 in the foregoing embodiment. For brevity, details are not described again.

In some embodiments, before step 402, the method may further include step 405 to step 407.

In step 405, the application sends a download request to the operator server, receives a terminal information obtaining request sent by the operator server, and sends the terminal information obtaining request to the LPA. The terminal information obtaining request includes an ICCID (ID information of the first subscription profile) and an EID (ID information of the eUICC).

In step 406, the LPA or the eUICC attempts to authenticate the application.

In an optional step, the LPA attempts, based on the terminal information obtaining request, to authenticate whether an EID obtained from the eUICC is the same as the EID in the terminal information obtaining request, where the EID is ID information of the eUICC.

Specifically, the LPA obtains, from the eUICC based on the ICCID of the terminal information obtaining request, the metadata information (such as the metadata) of the first subscription profile stored by the eUICC. Many pieces of information of the profile may be obtained based on the terminal information obtaining request (Getprofileinfo), and the metadata is one of the many pieces of information.

The metadata information of the first subscription profile includes the authentication information of the application allowed by the operator server to initiate subscription profile downloading. The authentication information includes the certificate or the hash value of the certificate of the application allowed by the operator server to initiate subscription profile downloading. The metadata information of the first subscription profile may further include the package name of the application allowed by the operator server to initiate subscription profile downloading. The certificate, the hash value of the certificate, or the package name of the application allowed by the operator server to initiate subscription profile downloading may be prestored in the operator server, or may be obtained by the operator server from another authentication server.

The LPA obtains the authentication information from the metadata information of the first subscription profile, and obtains, from an operating system of the device, information about the application that initiates the download request, and compares the authentication information and the information about the application that sends the terminal information obtaining request, to attempt to authenticate the application that initiates the download request.

Alternatively, the LPA sends an application authentication request to the eUICC. The application authentication request includes authentication information of the application that sends the terminal information request (that is, the application that triggers subscription profile downloading) and the ICCID. The application authentication request may further include interface information. The application authentication request may further include a package name of the application that sends the terminal information request (that is, the application that triggers subscription profile downloading). The LPA obtains, from an operating system of the device, the information about the application that sends the terminal information obtaining request. The authentication information of the application that sends the terminal information request (that is, the application that triggers subscription profile downloading) may be obtained by the LPA from the operating system of the device. Then the eUICC obtains the metadata information of the first subscription profile based on the ICCID, obtains the authentication information from the metadata information of the first subscription profile, and compares the authentication information and the information about the application initiating subscription profile downloading, to attempt to authenticate the application that initiates the download request.

For a process in which the LPA or the eUICC attempts to authenticate the application in step 406, refer to the description of step 106 in the foregoing embodiment. For brevity, details are not described again.

After the authentication succeeds in step 406, in step 407, the application generates a terminal information response message, and sends the terminal information response message to the operator server.

Then in step 402, the application triggers the LPA to initiate subscription profile downloading.

In step 403, the LPA or the eUICC attempts, by using the authentication information, to authenticate the application that triggers the LPA to initiate subscription profile downloading.

For an authentication process in step 403, refer to step 406. Details are not described again.

The LPA obtains the metadata information of the first subscription profile from the eUICC, and obtains the authentication information from the metadata information of the first subscription profile.

The LPA obtains the information about the application initiating subscription profile downloading, and compares the authentication information and the information about the application that triggers the LPA to initiate subscription profile downloading, to attempt to authenticate the application initiating subscription profile downloading.

Step 403 includes: The LPA obtains the information about the application initiating subscription profile downloading, and sends the information to the eUICC.

The eUICC obtains the authentication information from the metadata information of the first subscription profile, and compares the authentication information and the information about the application that triggers the LPA to initiate subscription profile downloading, to attempt to authenticate the application initiating subscription profile downloading.

In some embodiments, in the method, the device performs the authentication process in step 403 and step 404 after performing the authentication process in step 405 to step 407.

In some other embodiments, in the method, the device does not perform the authentication process in step 403 and step 404 after performing the authentication process in step 405 to step 407.

In some embodiments, in the method, the device does not perform the authentication process in step 405 to step 407, but directly performs the authentication process in step 403 and step 404.

Then, after the authentication succeeds in step 403, in step 404, the LPA downloads a second subscription profile from the subscription management server, and sends the second subscription profile to the eUICC, where the second subscription profile is different from the first subscription profile.

An embodiment of the present invention provides a method for performing subscription profile downloading on a device. The device includes a first eUICC, a second eUICC, an LPA, and an application. The method includes step 501 to step 506.

Step 501: The first eUICC downloads a first subscription profile from a subscription management server, where metadata information of the first subscription profile includes authentication information of an application allowed by the operator server to initiate subscription profile downloading. Step 502: The application triggers the LPA to initiate subscription profile downloading. Step 503: The LPA or the first eUICC attempts, by using the access control information in the first subscription profile, to authenticate an access permission of the application that initiates the download request. Step 504: After the authentication succeeds, the LPA downloads a second subscription profile from the signature management device, and sends the second subscription profile to the second eUICC, where the second subscription profile is different from the first subscription profile.

In some embodiments, between step 501 and step 502, the method further includes step 505 to step 507. In step 505, the application sends a download request to the operator server, receives a terminal information obtaining request sent by the operator server, and sends the terminal information obtaining request to the LPA. In step 506, the LPA or the first eUICC attempts to authenticate the application. In step 507, after the authentication succeeds, the application obtains second eUICC information from the second eUICC, generates a terminal information response message based on the second eUICC information, and sends the terminal information response message to the operator server.

In some embodiments, between step 505 and step 506, the method further includes step 507. In step 507, after obtaining the terminal information obtaining request, the LPA sends selection information to a display screen of the device, to display the second eUICC on the display screen so that a user selects the second eUICC to download the second subscription profile.

In the following embodiments, the application in the device may be an MNO APP. An MNO portal (operator service node) is a part of the operator server. The subscription management device may include an SM-DP+, or an SM-DP+ and an SM-DS.

Embodiment 1

Refer to the content shown in FIG. 1 for the following content.

0. An access control rule (Access Control Rule) used by the MNO APP to access the LPA is pre-configured in the LPA. In some embodiments, the access control rule is a root certificate of a signature certificate of the MNO APP, and the LPA pre-configures a GSMA CI certificate, or a GSMA CI public key and a public key ID, or obtains a GSMA CI certificate, or a GSMA CI public key and a public key ID from an eUICC by using an ES10 interface.
1. The device starts the MNO APP, and logs in to the MNO portal by using the MNO APP.
2. The MNO APP initiates a new profile download request and requests, from the MNO portal, to download a profile.
3. The MNO portal sends a terminal information obtaining request to the MNO APP based on a message of the profile download request.
4. The MNO APP invokes an LPA API (LPA interface), and sends the terminal information obtaining request to the LPA.
5. The LPA may obtain a signature certificate of the MNO APP from a device OS (an operating system on the device, such as an MS system or an Android system), and attempt to authenticate whether a root certificate of a certificate chain for the signature certificate is a GSMA CI certificate. The LPA generally obtains a signature certificate of an APP from the operating system. The signature certificate of the APP has information about a root certificate (such as a public key ID number of the root certificate and a signature of the root certificate). The LPA uses a pre-configured root certificate, namely GSMA CI information (such as a CI certificate, or a CI public key and a public key identity), to attempt to authenticate whether the root certificate of the APP certificate is a GSMA CI certificate.
6. After the authentication succeeds, the LPA sends a request for obtaining eUICC information (getEUICCInfo), and may optionally further include a request (GetEID) for obtaining an EID (eUICC ID).
7. The eUICC returns the eUICC information to the LPA, and optionally further returns the EID.
8. The LPA sends a terminal information response message to the MNO APP based on the eUICC information, where the terminal information response message includes the eUICC information and optionally further includes the EID, and the terminal information response message may optionally further include device information (device info).
9. The MNO APP sends the terminal information response message to the MNO portal.
10. The MNO portal sends a profile order (profile order) to the SM-DP+ based on the terminal information response message. Specifically, the MNO portal determines, based on the eUICC info, a type (profile type) of a profile that should be ordered from the SM-DP+, for example, determines, based on a specification version number, eUICC capabilities, and the like in the eUICC info, the type of the profile that needs to be ordered. If the terminal information response message includes the device info, the device info may be used to determine a type of a profile to be ordered from the SM-DP+, for example, determine, based on radio access capabilities in the device info, the type of the profile that needs to be ordered. The device info can help order a more accurate type of profile. The profile order includes the EID, a hash value (hash(Cert)) of the signature certificate of the MNO APP or the signature certificate (Cert). Compared with directly transmitting the signature certificate (Cert), the hash(Cert) has a small data amount and is convenient to be sent. The profile order may further include a package name (package name) of the MNO APP and a hash algorithm (hash algorithm) of the signature certificate of the MNO APP. If a download event needs to be registered to the SM-DS, the MNO portal further provides an SM-DS address. The package name (package name) of the MNO APP and the hash algorithm (hash algorithm) of the signature certificate of the MNO APP may be subsequently used to attempt to authenticate the MNO APP triggering a download request.
11. The SM-DP+ generates an event ID (eventID) based on the profile order, and registers the download event to the SM-DS. Transmission parameters include the eventID, the EID, and the hash(Cert). Optionally, the transmission parameters further include the package name (package name) of the MNO APP, the hash algorithm (hash algorithm) of the signature certificate of the MNO APP, and the like.
12. The SM-DP+ returns a profile order response message to the MNO portal. The message includes a polling address, and the polling address is an SM-DP+ address or the SM-DS address. The message further includes a profile order matching ID (matchingID) or the event ID (eventID). The profile order matching ID (matchingID) is generated and stored by the SM-DP+.
13. The MNO portal sends a trigger download (for example, trigger download) message to the MNO APP. The message includes the polling address, and optionally further includes the matchingID (the matchingID is sent when the SM-DS is not used) or the eventID, the hash algorithm, and the like.
14. The MNO APP invokes the LPA API and sends the trigger download message to the LPA.
15. Optionally, if the LPA has not attempted to authenticate the MNO APP, the LPA obtains the signature certificate of the MNO APP from the device OS, and attempts to authenticate whether the root certificate of the certificate chain for the signature certificate is a GSMA CI certificate. If the LPA receives the hash algorithm (hash algorithm) in step 14, the LPA obtains the hash value (hash (Cert)) of the certificate from the device OS based on the hash algorithm.
16. The LPA sends an event obtaining request to the SM-DS, where the event obtaining request includes the EID, a CERT (including the MNO APP certificate Cert or the hash(Cert), and optionally including the event ID (eventID) and the MNO APP package name (package name)), to obtain an event record (event record).
17. The SM-DS searches for the corresponding event record (event record) based on the EID or eventID; obtains the hash(Cert) from the event obtaining request, or uses the hash algorithm to calculate the hash (Cert) based on the MNO APP certificate; determines, through comparison, whether the hash(Cert) and the received MNO APP package name (package name) are the same as corresponding values in the event record; and if the hash(Cert) and the package name are the same as the corresponding values in the event record, step 18 is performed.

18. The SM-DS returns the event record to the LPA, where the event record includes the SM-DP+ address and the matchingID.
19. The LPA sends an authenticate client request to the SM-DP+, where the authenticate client request includes the EID, the matchingID, the CERT (the MNO APP certificate or the hash(Cert)), and may optionally further include the package name, to request to download the profile.
20. The corresponding profile order (profile order) is searched for based on the matchingID; if CERT information transmitted in the profile order is the MNO APP certificate, the SM-DP+ calculates a hash(Cert) based on the hash algorithm, and the SM-DP+ determines, through comparison, whether the calculated hash (Cert)/the hash(Cert) received from the LPA and the received package name are the same as APP information related to the profile order; and if the calculated hash(Cert)/the hash(Cert) received from the LPA and the received package name are the same as the APP information related to the profile order.
21. The LPA downloads the profile from the SM-DP+, and sends the profile to the eUICC, and the eUICC completes installation.

According to this embodiment, the device can initiate a profile download request by using any MNO APP having a certificate signature issued by the GSMA CI, and does not need to preset access control information for a specific APP in the eUICC; and the SM-DP+ or the SM-DS performs authentication on the signature certificate and package name of the MNO APP, to ensure that the corresponding download request is from a trusted MNO APP.

Embodiment 2

Figure 2A:
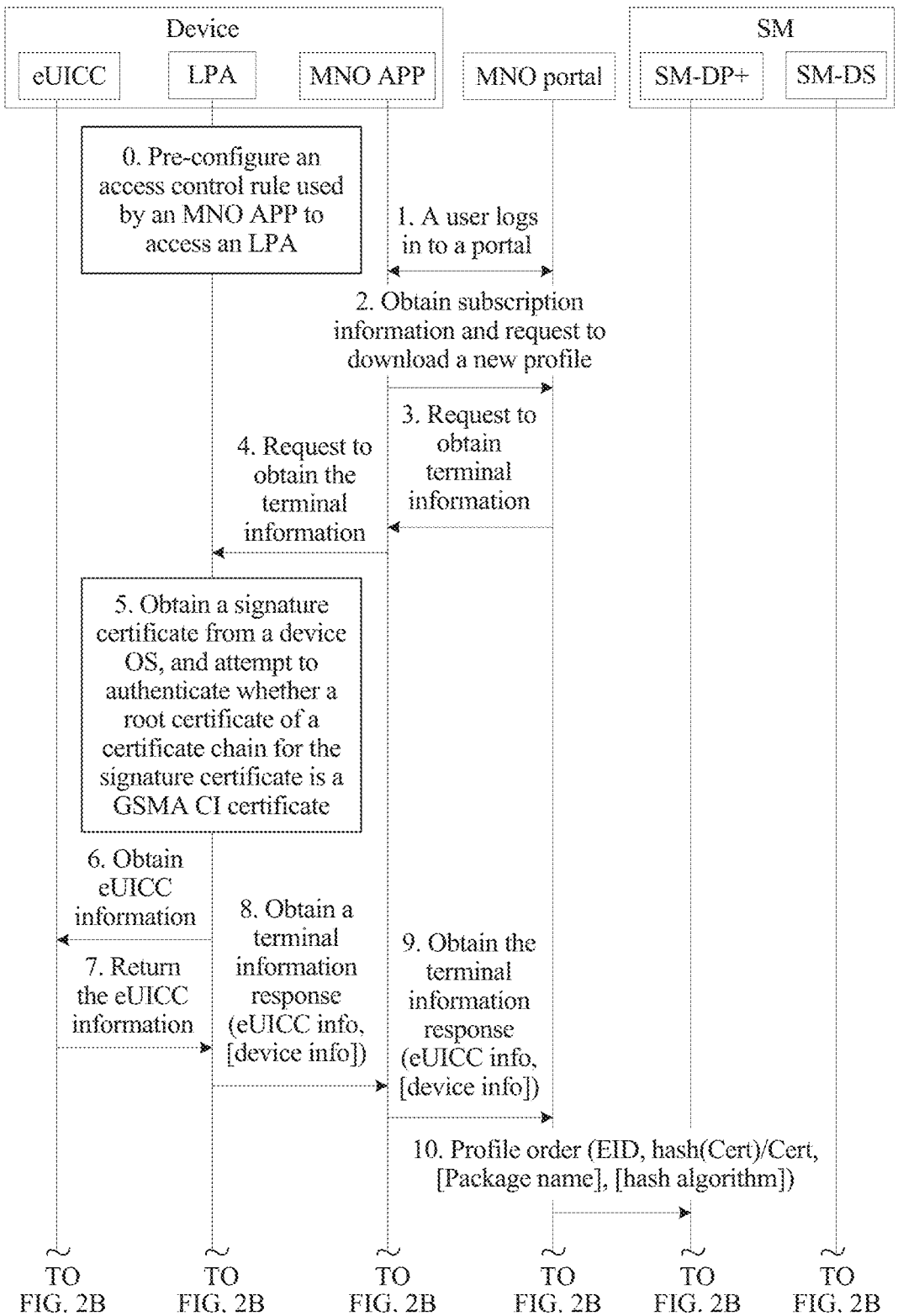
FIG. 2A to FIG. 8C are schematic flowcharts of subscription profile downloading methods according to some embodiments of the present invention.
Figure 2B:
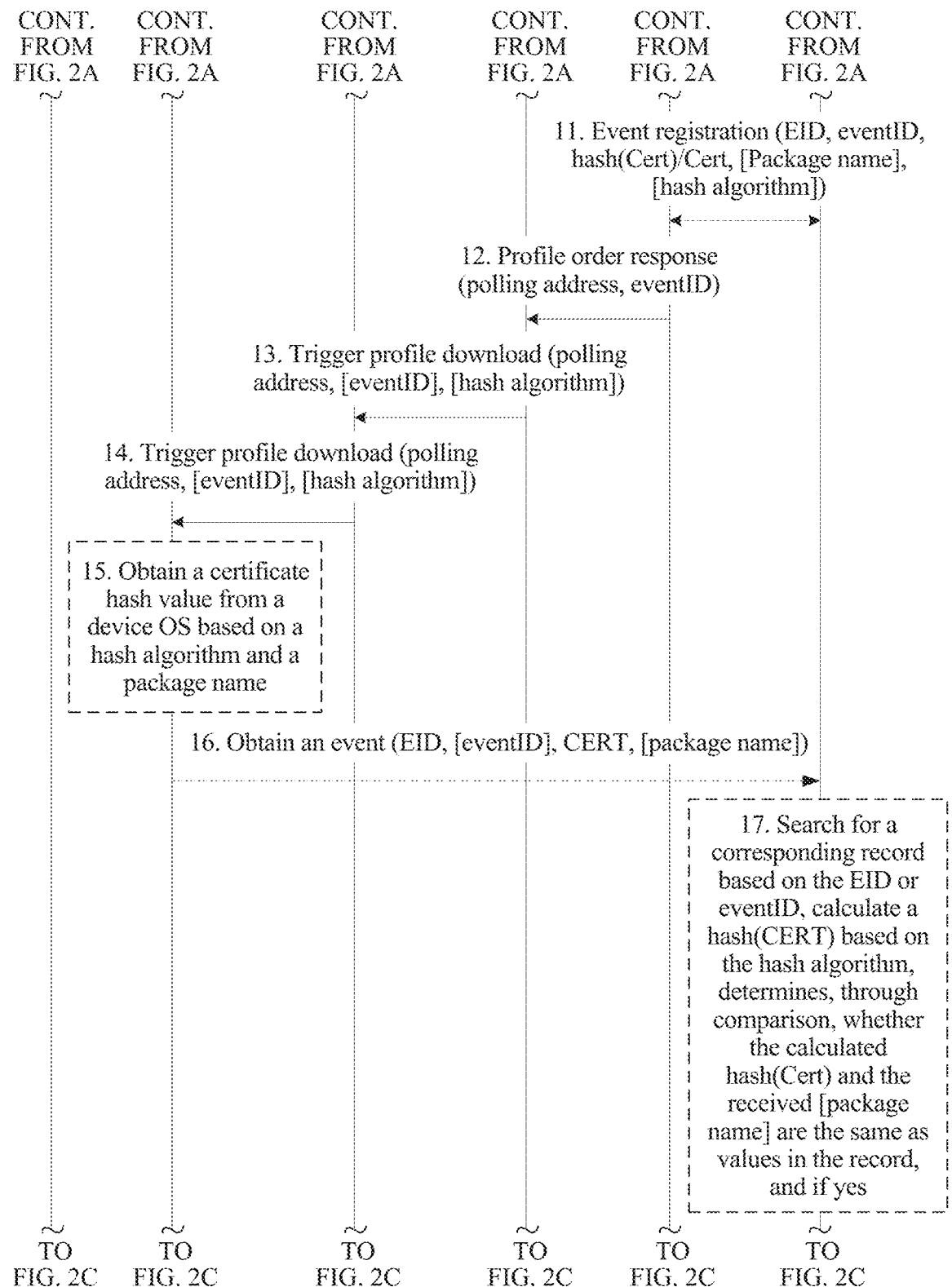
Figure 2C:
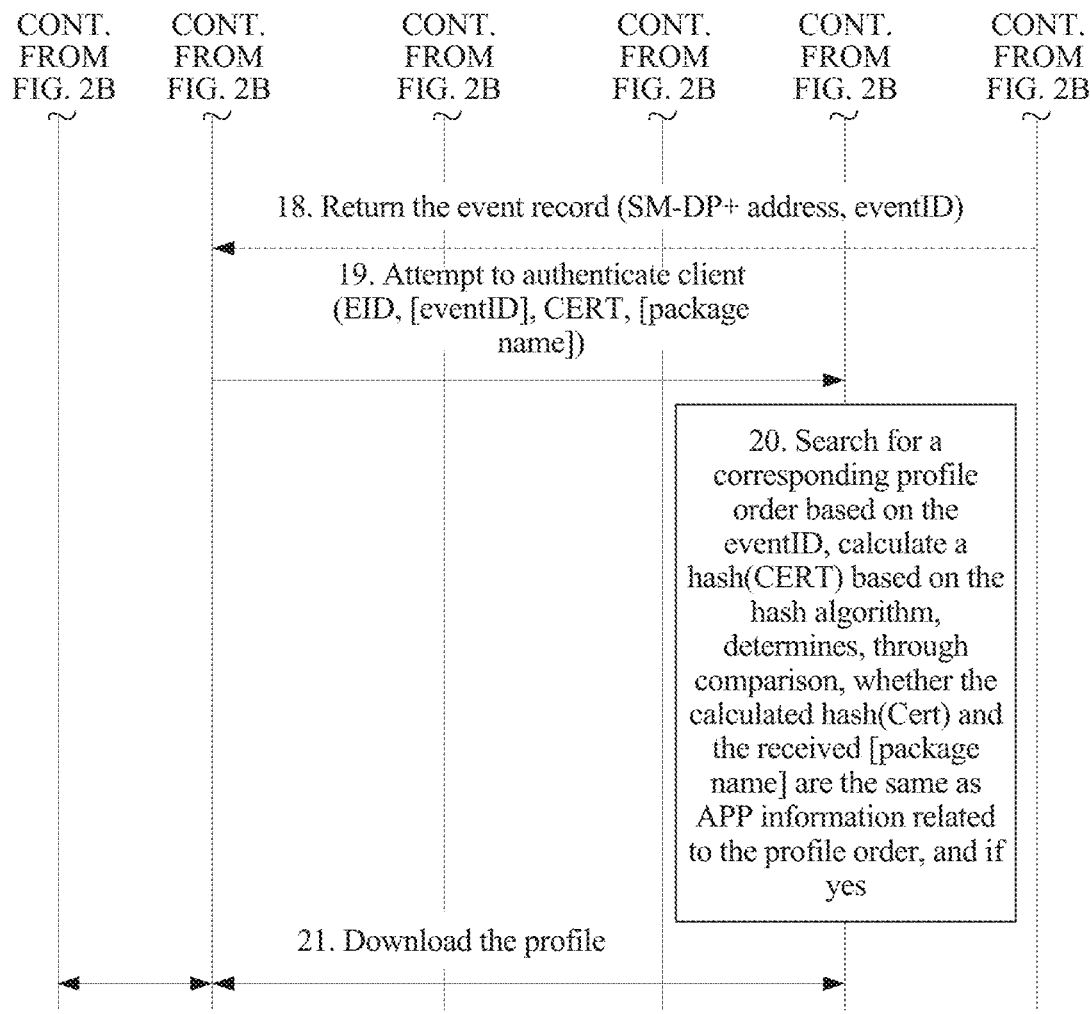

On the basis of the embodiment, referring to the content shown in FIG. 2A to FIG. 2C, if the SM-DS is not deployed by the operator, after step 10, step 11 does not need to be performed, and in step 12, the SM-DP+ returns the profile order response message to the MNO portal. The response message includes the profile order matching ID (Matching ID). Then the device does not need to send the event obtaining request to the SM-DS. In other words, step 16, step 17, and step 18 are omitted.

Embodiment 3

Figure 3A:
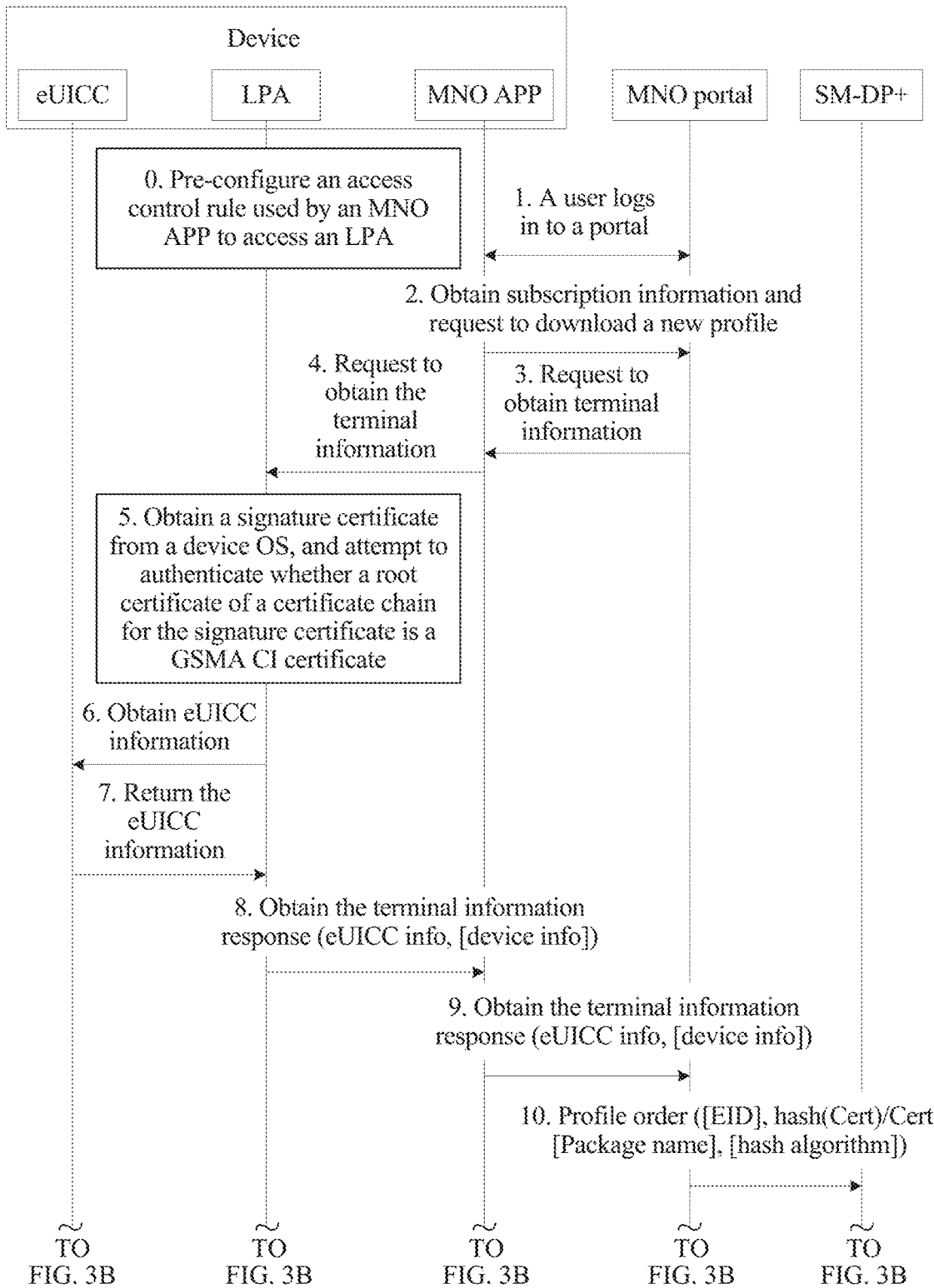
Figure 3B:
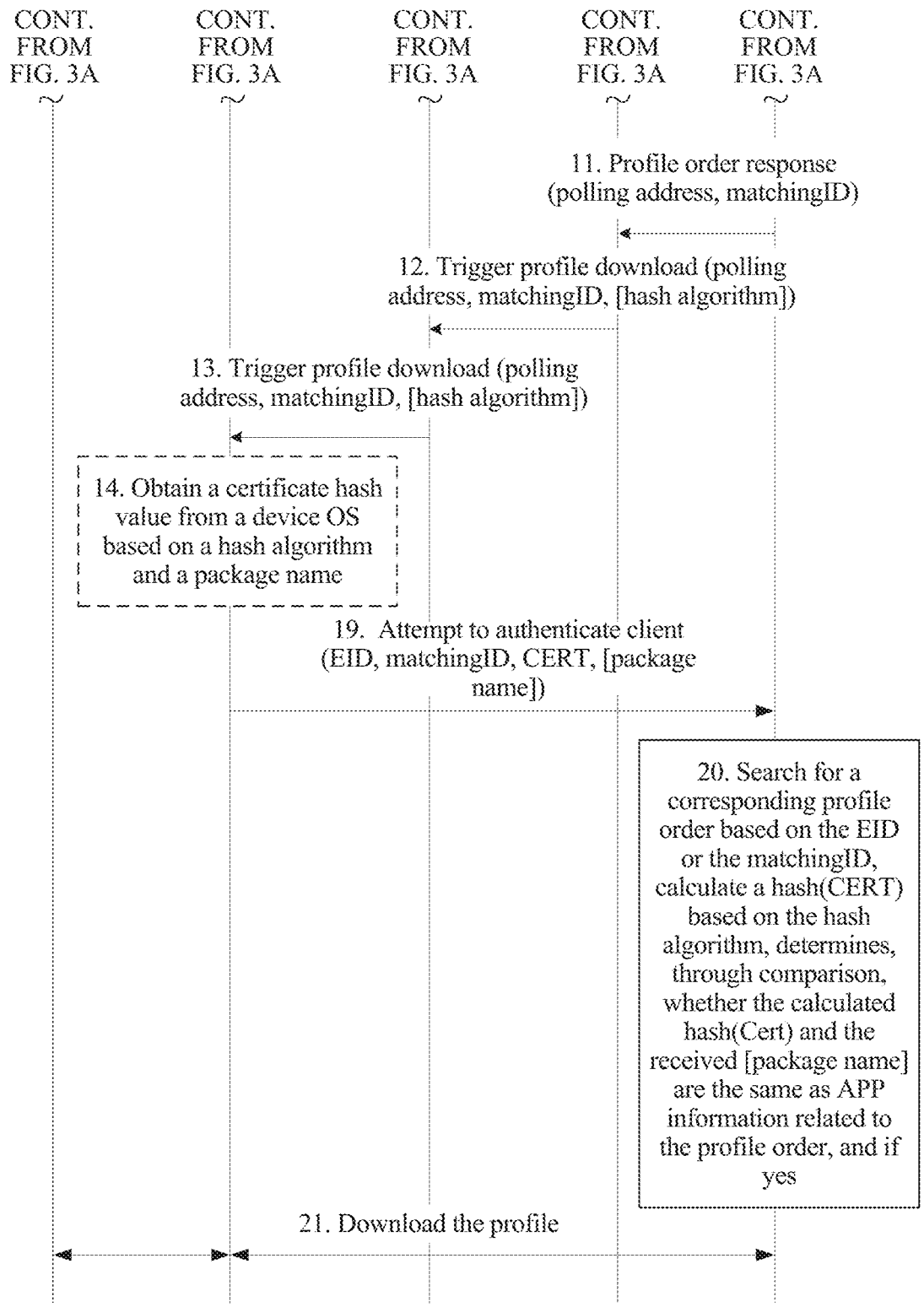

In this embodiment, referring to the content shown in FIG. 3A and FIG. 3B. On the basis of Embodiment 1, different from Embodiment 1, in this embodiment, the eUICC attempts, based on GSMA CI information configured in the eUICC, to authenticate whether the root certificate of the certificate chain for the APP signature certificate is a GSMA CI.

Specifically, different from step 0 in Embodiment 1, an access control rule (Access Control Rule) used by the MNO APP to access the LPA is pre-configured in the eUICC. In some embodiments, a GSMA CI certificate, or a public key of the CI certificate and a public key identity are pre-configured in the eUICC.

In addition, different from step 5 in Embodiment 1, in step 5.1 in this embodiment, the LPA obtains the signature certificate of the MNO APP from the device OS; in step 5.2, the LPA sends the obtained signature certificate to the eUICC; and in step 5.3, the eUICC attempts to authenticate whether the certificate chain of the root certificate of the signature certificate sent by the LPA is a GSMA CI certificate.

A security level of the eUICC is higher than a security level of the LPA. Therefore, higher security is achieved by using the eUICC to perform authentication.

Embodiment 4

Figure 4A:
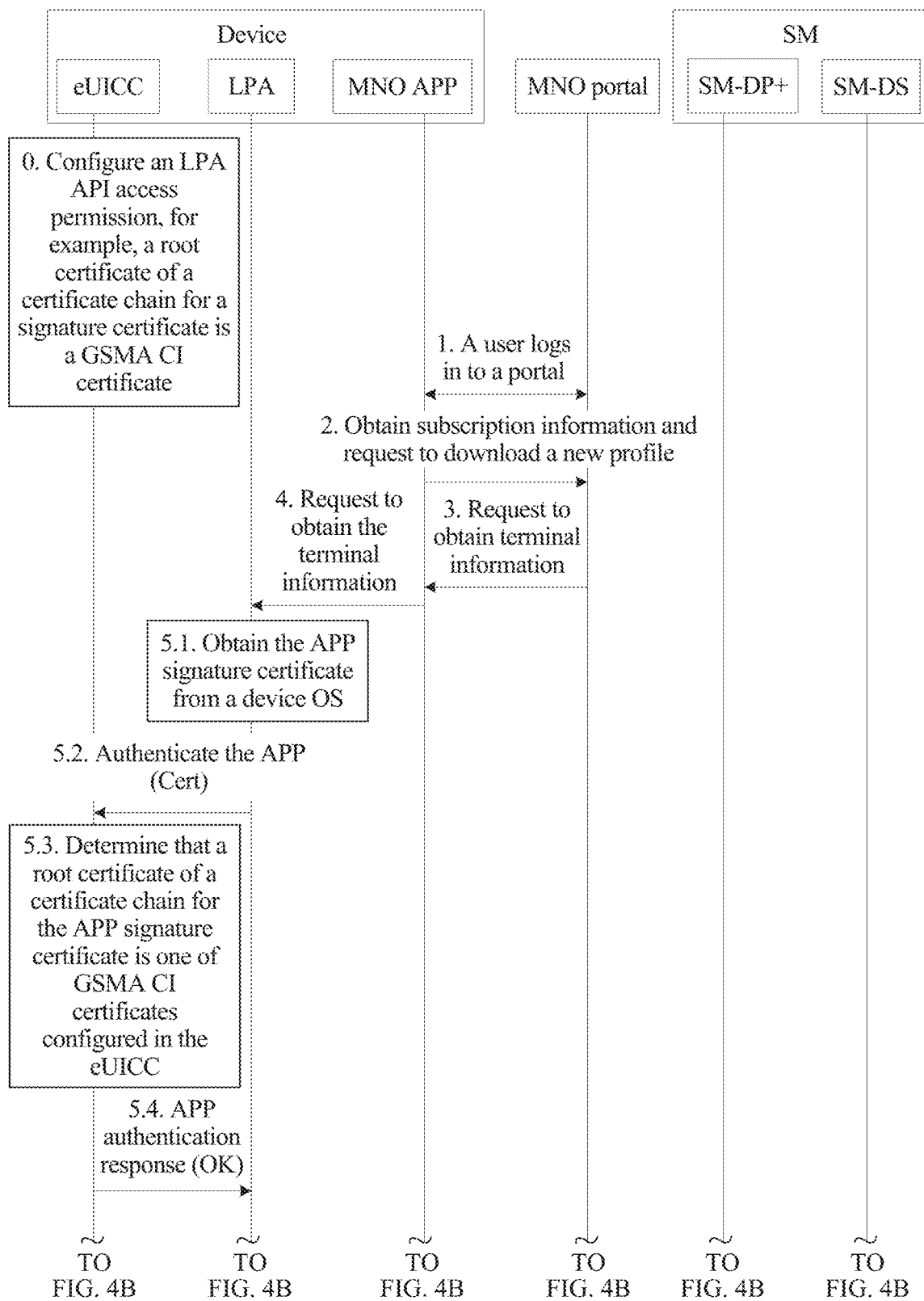
Figure 4B:
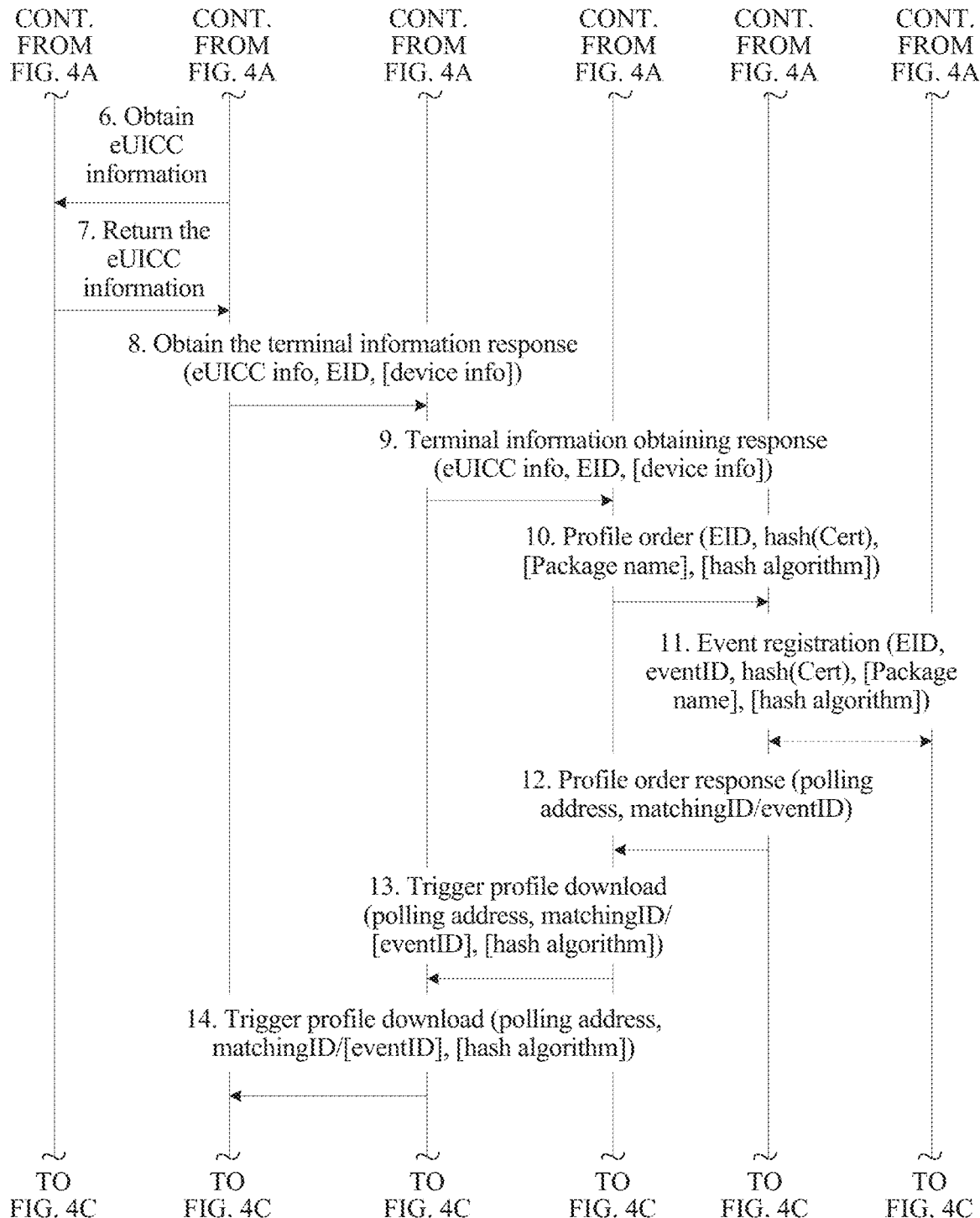
Figure 4C:
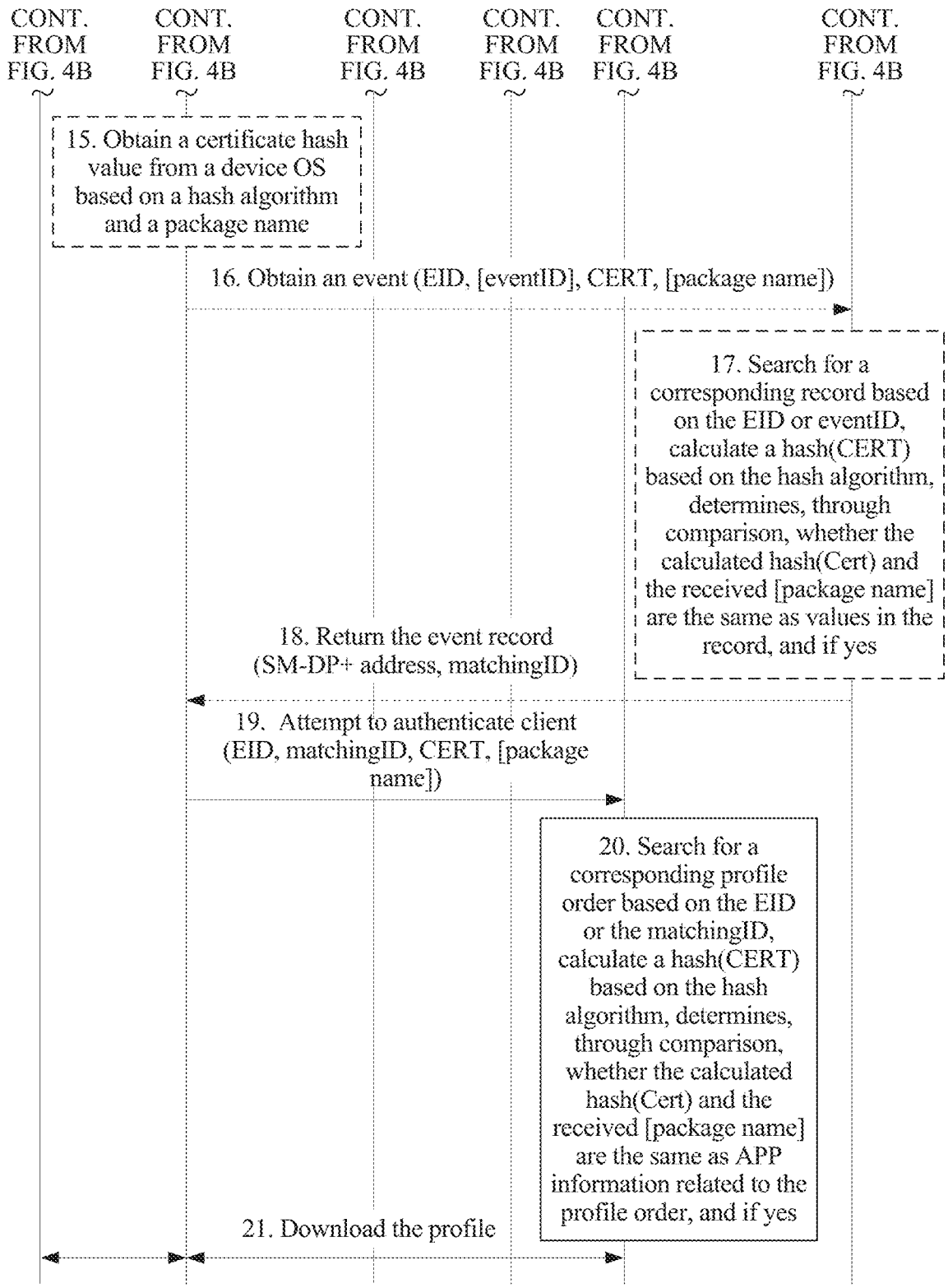
Figure 5A:
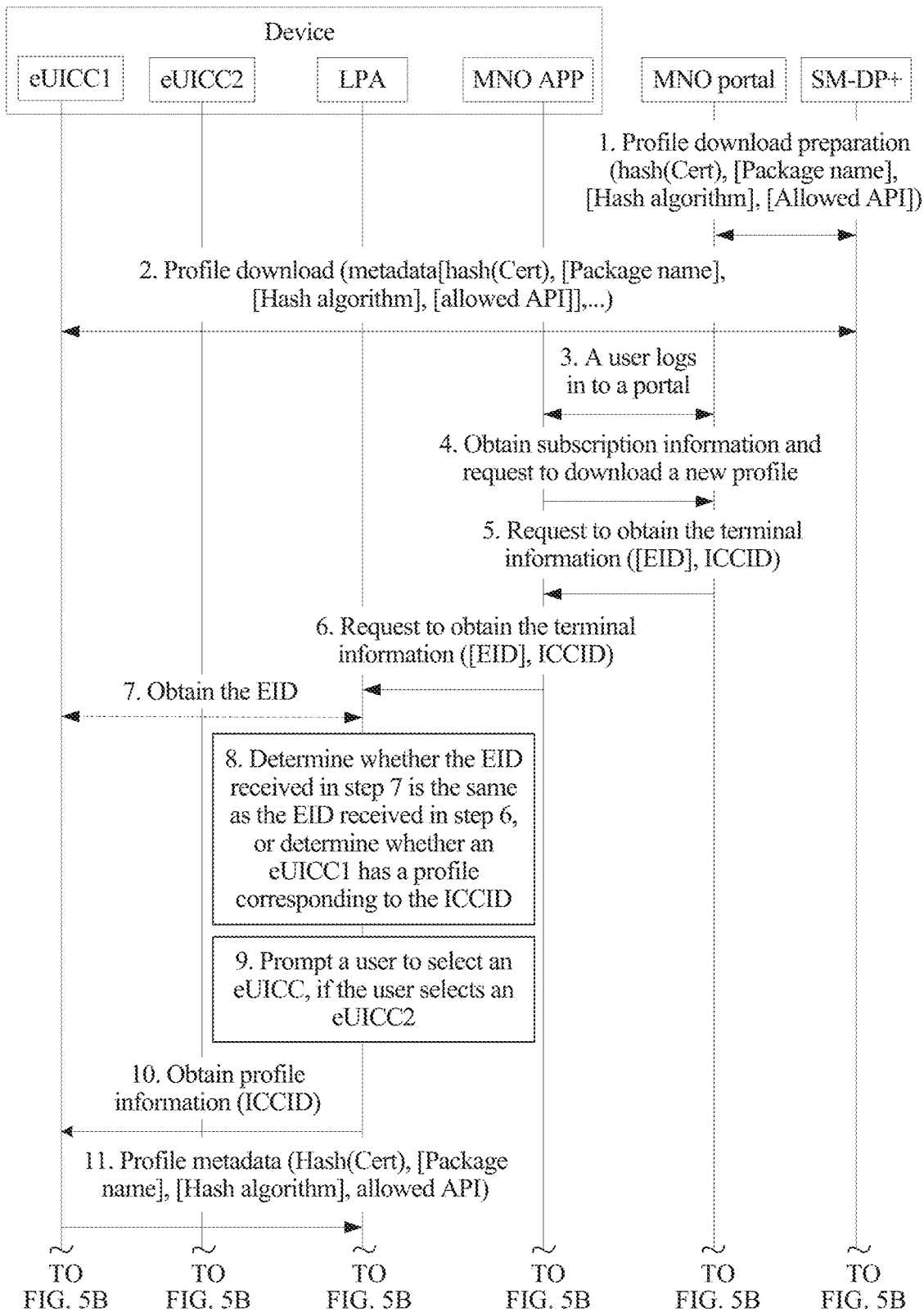
Figure 5B:
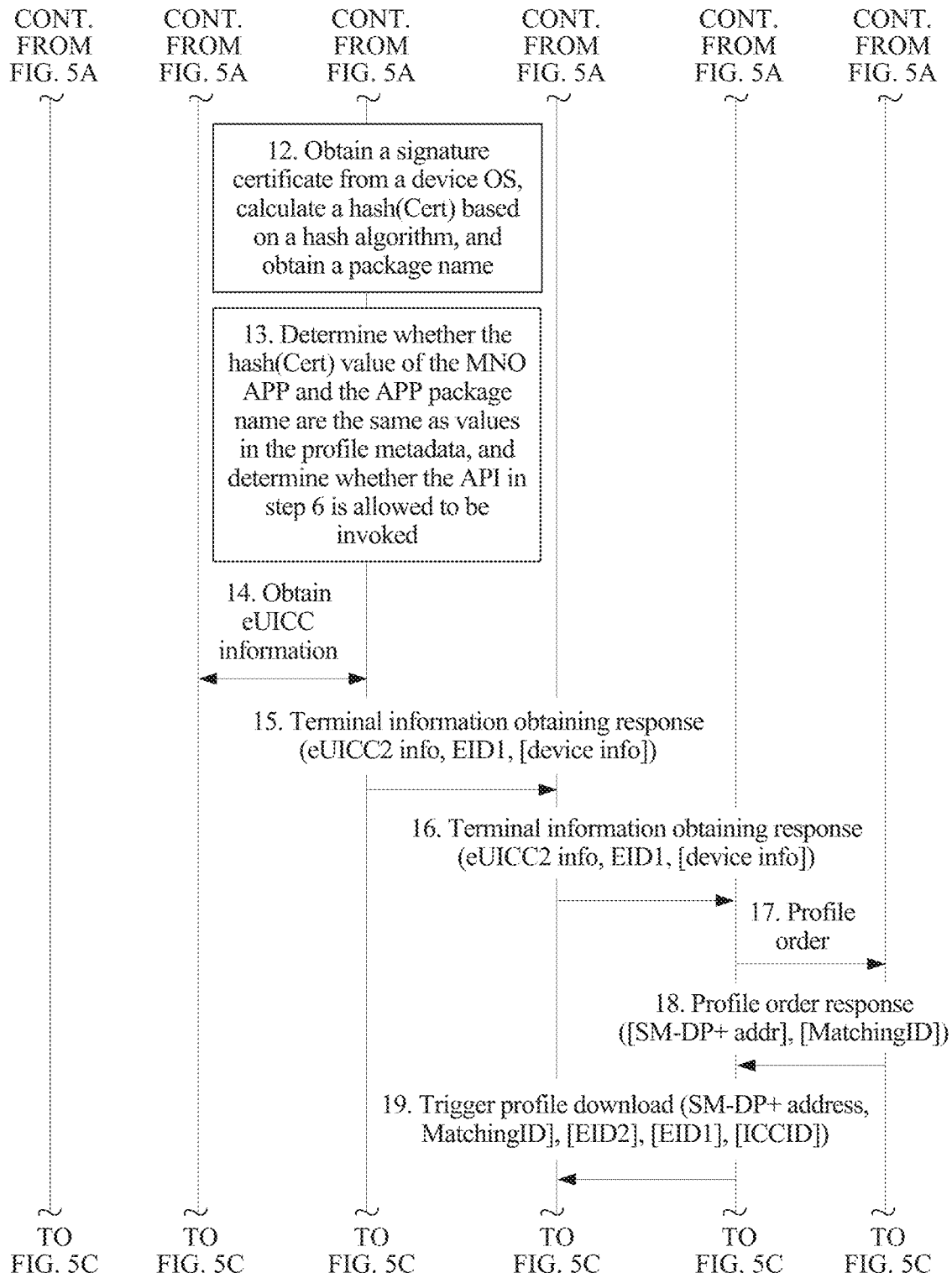
Figure 5C:
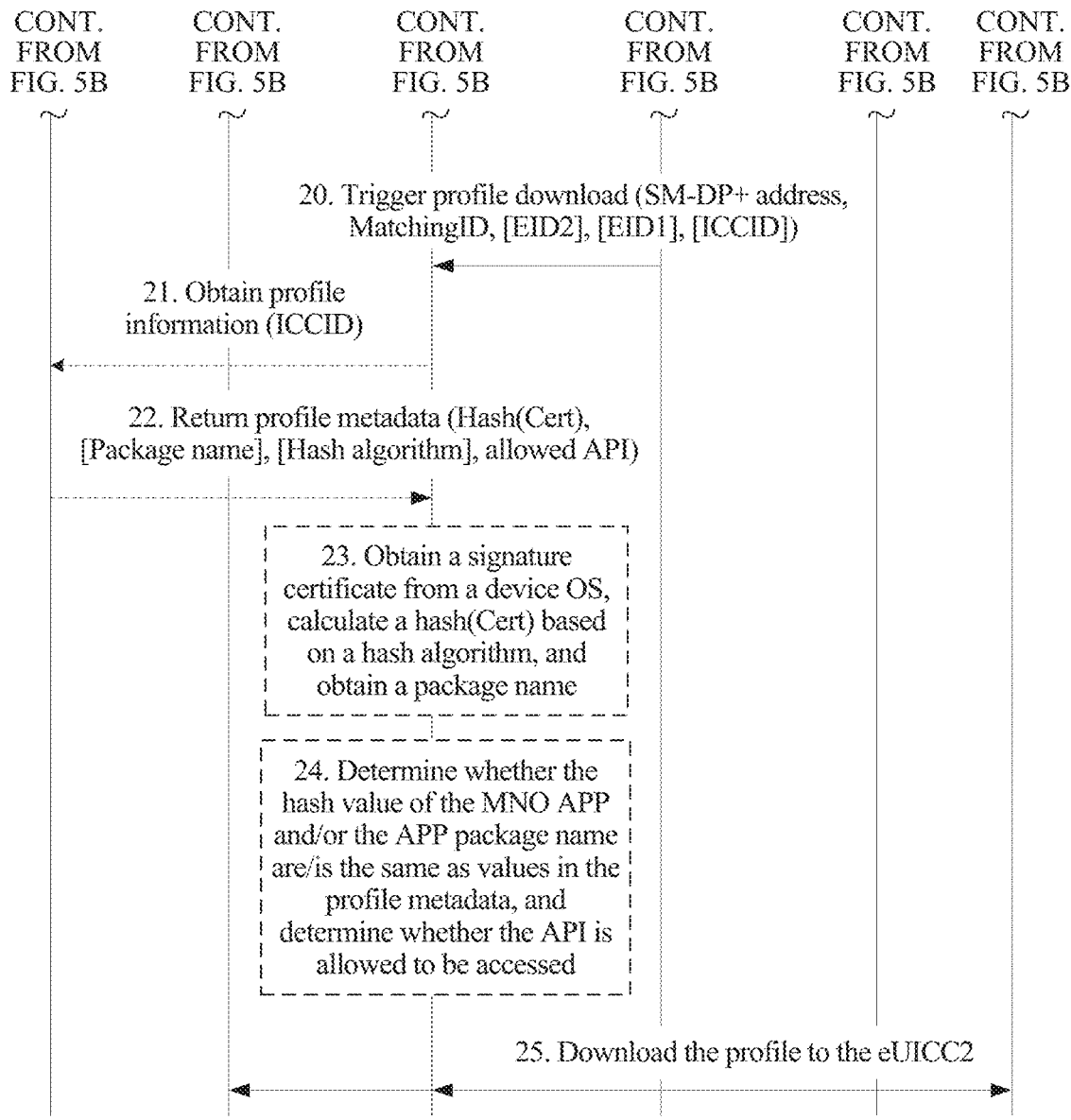

On the basis of Embodiment 3, referring to the content shown in FIG. 4A to FIG. 4C, similar to Embodiment 2, if the SM-DS is not deployed by the operator, step 11, step 16, step 17, and step 18 are omitted. In addition, a current eUICC system architecture and access control mechanism may be used to invoke an LPA API for an APP on the device to perform profile downloading for access control.

Embodiment 5

This embodiment is used in a dual-card scenario. Referring to the content shown in FIG. 5A to FIG. 5C, after the operator downloads a profile in a card 1 (eUICC1), if the user chooses to download a profile of the same operator in a card 2 (eUICC2), the card 1 can be used to perform authentication on the APP. Then the APP is allowed to access the card 2. A method for obtaining an APP certificate by the LPA is the same as that in the foregoing embodiment.

1. When the MNO portal customizes a profile (such as a first subscription profile) from the SM-DP+, a hash value of a signature certificate of the MNO APP that is stored by the MNO portal is sent to the SM-DP+, and optionally a package name (Package name) of the MNO APP, a hash algorithm (Hash algorithm), and an API that the APP is allowed to access (allowed API) are sent to the SM-DP+, so that the SM-DP+ adds the above information to metadata (profile metadata).
2. The SM-DP+ downloads the profile including the foregoing profile metadata information to the eUICC1.
3. The device starts the MNO APP, and logs in to the MNO portal by using the MNO APP.
4. The MNO APP initiates a new profile download request and requests, from the MNO portal, to download a profile.
5. The MNO portal sends a terminal information obtaining request to the MNO APP, where the terminal information obtaining request includes ID information of the profile (ICCID), and optionally further includes ID information of the eUICC1 (EID1).
6. The MNO APP invokes the LPA API to request to obtain terminal information, where the message includes the ICCID, and optionally further includes an EID.
7. If the terminal information obtaining request received by the LPA in step 6 includes the EID1, an EID needs to be obtained from the eUICC1 or the eUICC2 to determine which one of the two eUICCs is the eUICC1.
8. The LPA determines whether the EID received in step 7 is the same as the EID received in step 6; or if the EID is not carried in step 6, the LPA needs to determine whether the eUICC1 or the eUICC2 includes the profile corresponding to the ICCID. A specific process may be that the LPA sequentially queries ICCIDs of profiles (that is, the first subscription profile) that have been installed in the two eUICCs. and compares the ICCIDs with the ICCID received in step 6. After authentication succeeds, step 9 is performed.

9. The LPA displays prompt information on a display screen of the device to prompt the user to select an eUICC for installing a new profile (corresponding second subscription profile), if the user selects the eUICC2.
10. The LPA sends a request for obtaining information about the installed profile (GetProfileInfo) to the eUICC1, where the request for obtaining the information about the first subscription profile carries the ICCID of the profile.
11. The eUICC1 returns the profile metadata of the installed profile corresponding to the ICCID to the LPA, where the metadata includes the hash value of the certificate of the MNO APP, and optionally further includes the package name of the MNO APP, the hash algorithm, and the API that the APP is allowed to access (allowed API).
12. The LPA obtains a certificate of an MNO APP that is stored by the device from the device OS, and uses the hash algorithm returned by the eUICC1 in step 11 to calculate a hash value of the certificate of the MNO App stored by the device, or the LPA obtains a hash value of the certificate of the MNO APP from the device based on the hash algorithm received in step 11, and obtains a package name of the MNO APP stored by the device.
13. The LPA determines whether the hash value and the package name of the MNO APP that are obtained in step 12 are the same as the hash value and the package name in the profile metadata obtained in step 11, to determine whether the API in step 6 is allowed to be invoked. If the authentications succeed, step 14 is performed.
14. The LPA sends a request for obtaining eUICC information (GetEUICCInfo) to the eUICC2 to obtain eUICC2 info, and may optionally further obtain ID information EID2 of the eUICC2.
15. The LPA combines the obtained eUICC2 information (eUICC2 info), the EID2, and optional device information (device info), generates a terminal information response message, and sends the terminal information response message to the MNO APP.
16. The MNO APP sends the terminal information response message to the MNO portal.
17. The MNO portal sends a profile order (profile order) to the SM-DP+ based on the eUICC2 info and the device info, and requests the SM-DP+ to generate a new profile (second subscription profile).
18. The SM-DP+ returns an SM-DP+ address and a profile order matching ID (matchingID).
19. The MNO portal sends a download trigger request to the MNO APP. The download trigger request carries the SM-DP+ address and the matchingID, and may optionally further carry the EID2, the EDI1, and the ICCID of the first subscription profile.
20. The MNO APP sends the download trigger request to the LPA.
21. If the LPA does not cache the obtained profile metadata after steps 10 and 11, the LPA obtains the profile metadata from the eUICC1 again.
22. The eUICC1 returns the profile metadata to the LPA after step 21.
23. The LPA obtains the certificate of the MNO APP stored by the device from the device OS, calculates the hash value of the certificate of the MNO APP stored by the device by using the hash algorithm returned by the eUICC1 in step 22, and obtains the package name of the MNO APP stored by the device.

The LPA determines whether the hash value calculated in step 23 and the obtained package name of the MNO APP are the same as the hash value and the package name in the profile metadata obtained in step 22, to determine whether the API in step 6 is allowed to be invoked. If the authentications succeed, step 25 is performed.

Herein, step 23 and step 24 may be independent of the authentication of the MNO APP in step 12 and step 13. The allowed API in step 1 and step 2 is optional. If there is no allowed API in step 1 and step 2, the LPA considers by default that the APP has access to all APIs. and it can be determined whether to perform step 23 and step 24 after step 12 and step 13 based on an LPA implementation rule. If there is an allowed API in step 1 and step 2, authentication is performed each time the API is invoked, and therefore step 23 and step 24 are performed after step 12 and step 13.

24. If the LPA obtains the EID2 in step 20, the LPA selects the eUICC2 based on the EID2, or the LPA downloads the new profile (second subscription profile) to the eUICC2 based on the eUICC2 selected by the user in step 9, where the second subscription profile is different from the first subscription profile.

According to this embodiment, access control information of the MNO APP in an eUICC (eUICC1) on the device is used to determine a permission of the MNO APP to invoke the LPA API, and the profile can be downloaded to a different eUICC (eUICC2).

Embodiment 6

Figure 6A:
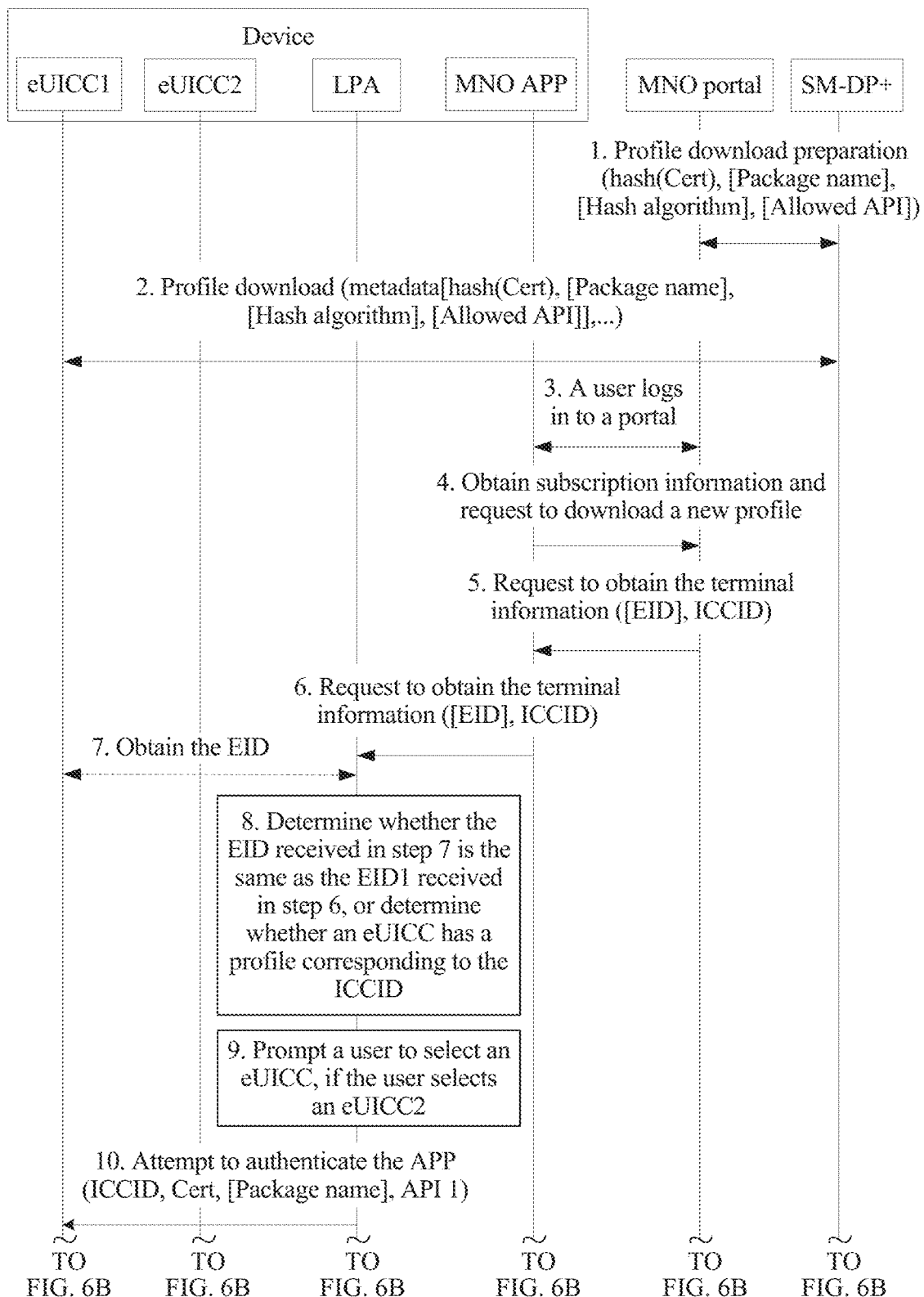
Figure 6B:
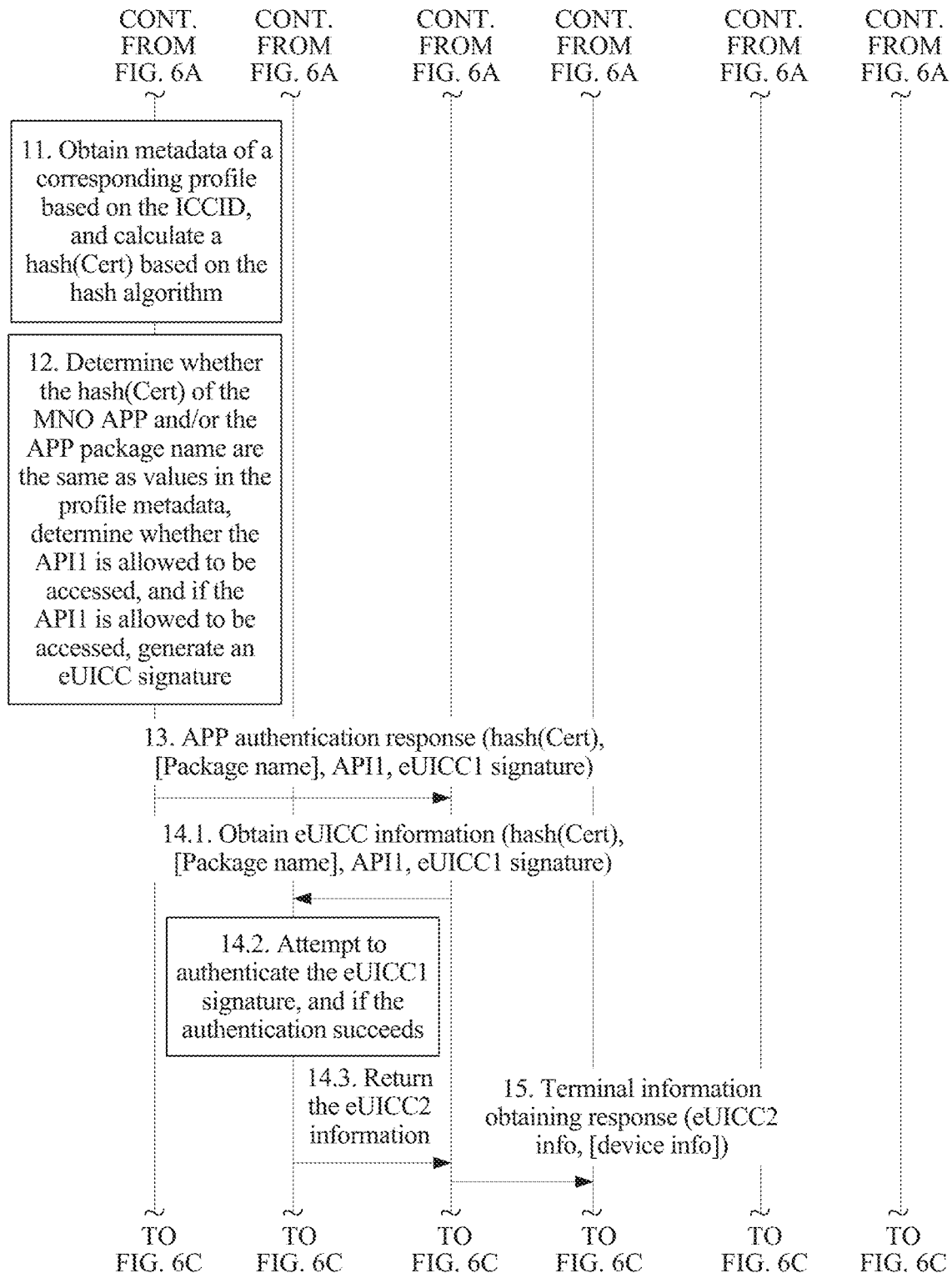
Figure 6C:
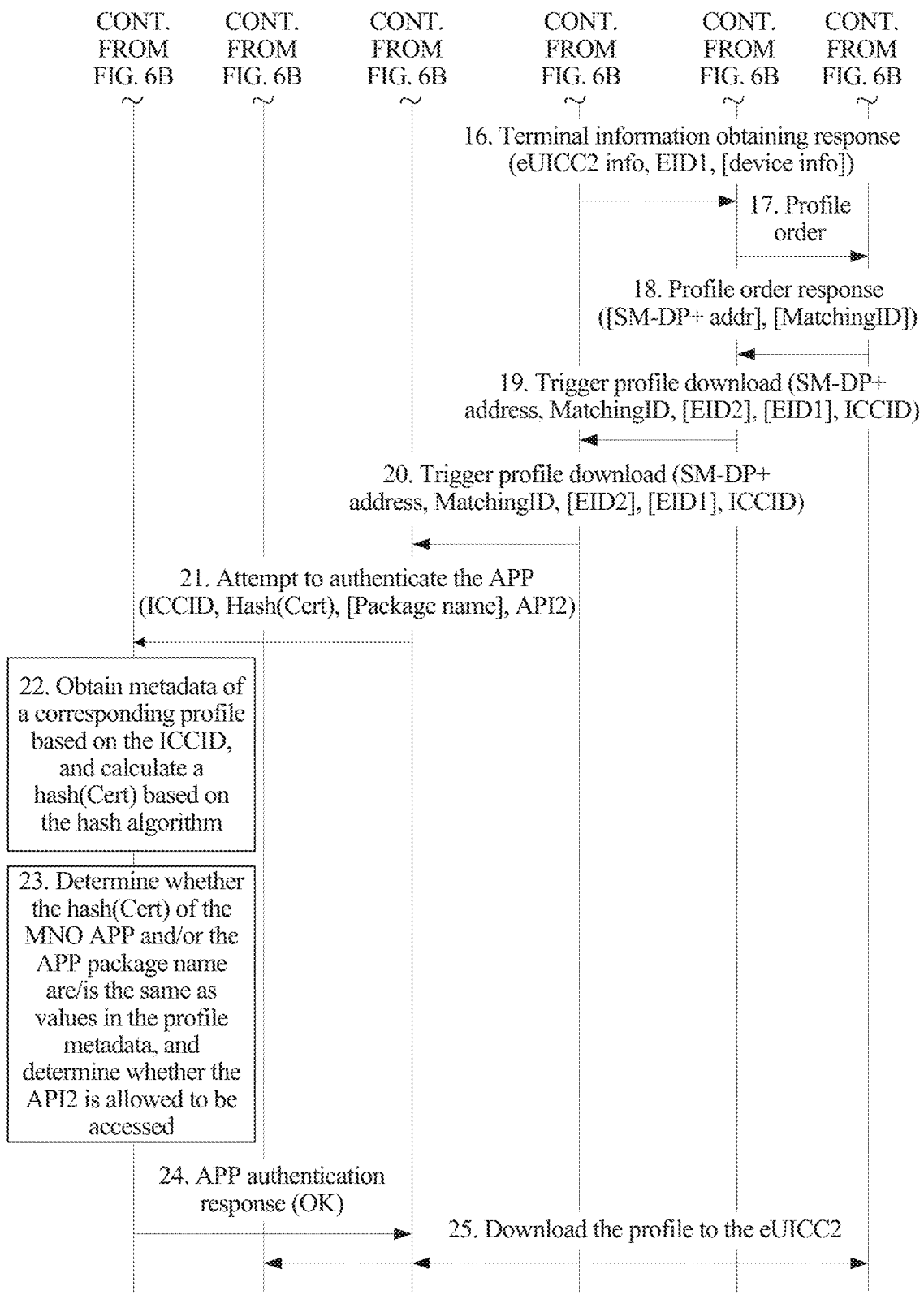

Referring to the content shown in FIG. 6A to FIG. 6C, the difference between this embodiment and Embodiment 5 is that the embodiment is used in a dual-card scenario. To be specific, after the operator downloads a profile in a card (eUICC), access control information of an APP in a profile downloaded in a card 1 (eUICC1) is used to perform access control.

Specifically, differences from Embodiment 5 are as follows:

In step 10, the LPA sends an MNO APP authentication request to the eUICC1, where the request carries an ICCID, a certificate of the MNO APP or a certificate chain, a package name of the MNO APP, and an API1, and the API1 is an identifier of an LPA API invoked by the APP, and is used to indicate which API is invoked. If an allowed API is included in metadata, the information needs to be sent; if the allowed API is not included, the information does not need to be sent.

11. The eUICC1 obtains stored metadata of a corresponding profile based on the ICCID, and calculates a hash value (hash (Cert)) of the certificate based on a hash algorithm.
12. The eUICC1 determines whether the calculated hash (Cert) and the package name (package name) of the MNO APP are the same as values in the profile metadata, to determine whether the LPA API is allowed to be accessed.
13. The eUICC1 returns an authentication result to the LPA, and if the authentication succeeds, steps 14.1, 14.2, and 14.3 that are similar to step 14 in Embodiment 5 continue to be performed.

Compared with Embodiment 5, in this embodiment, an eUICC (that is, the eUICC2) that needs to download a profile performs access control of the APP, thereby further improving security.

In this embodiment, after an existing profile is downloaded, authorization information of a specific APP does not need to be preset in an eUICC that needs to download a profile, and the access control information of the APP in the profile downloaded in the eUICC can be used to perform access control.

Embodiment 7

Figure 7A:
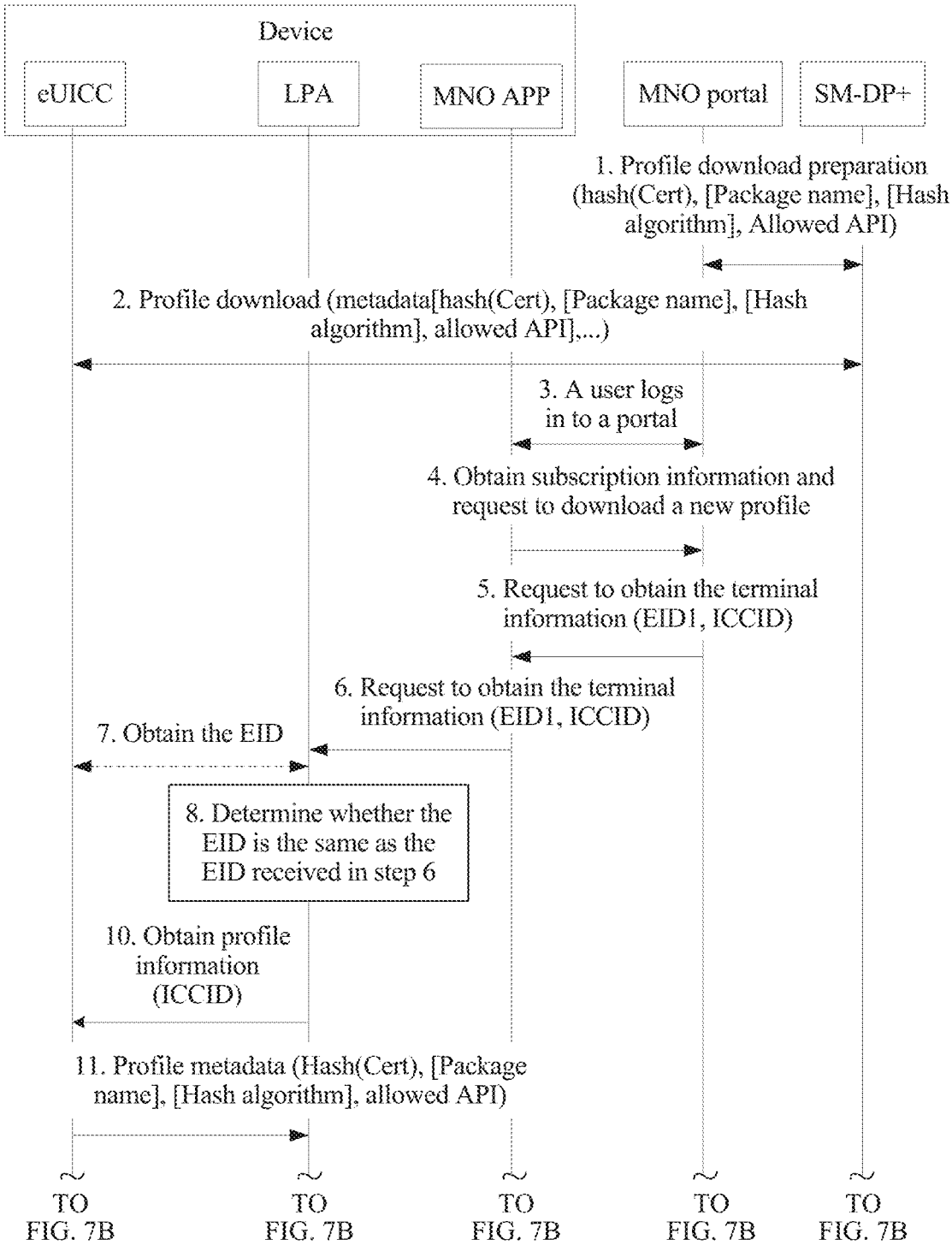
Figure 7B:
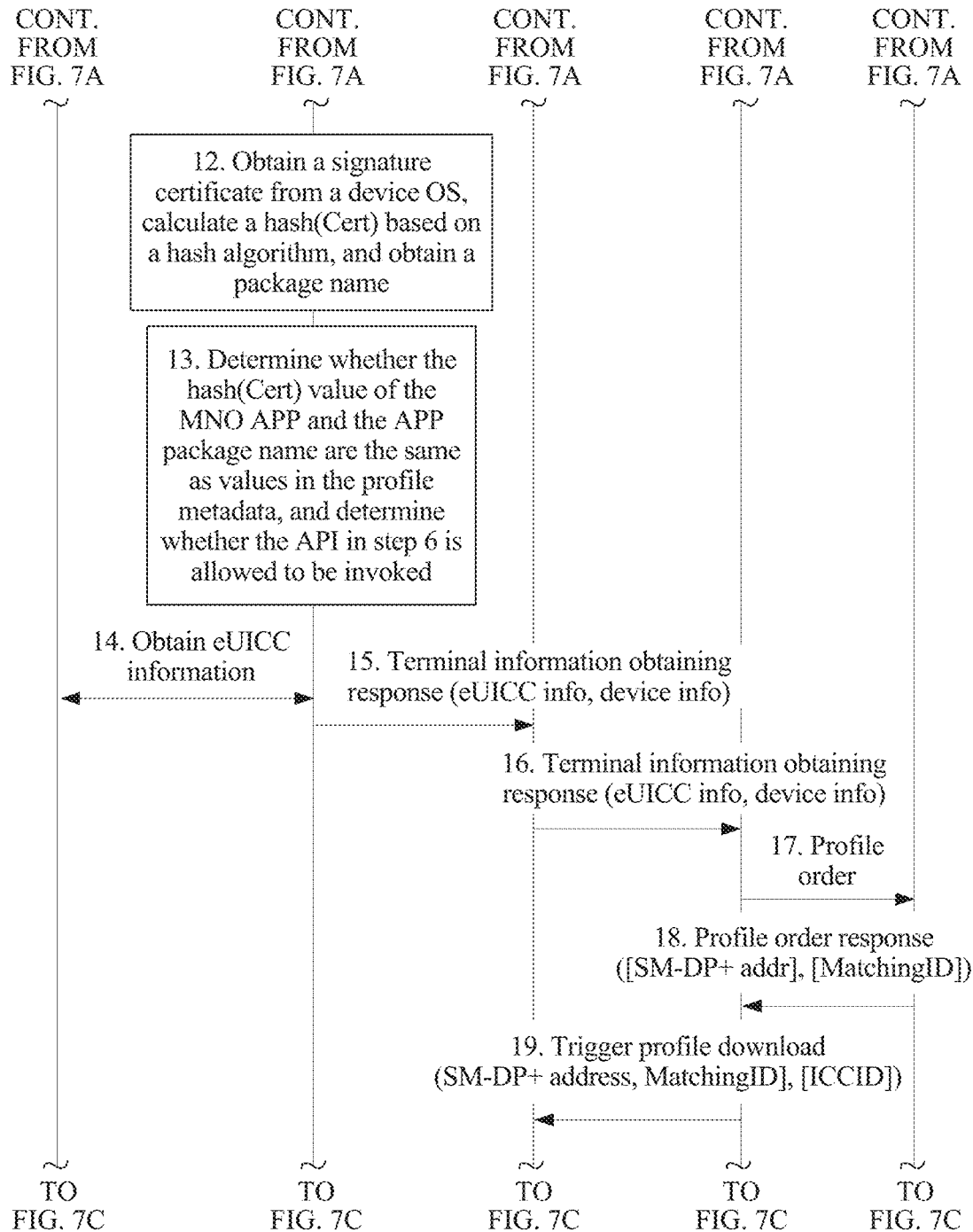
Figure 7C:
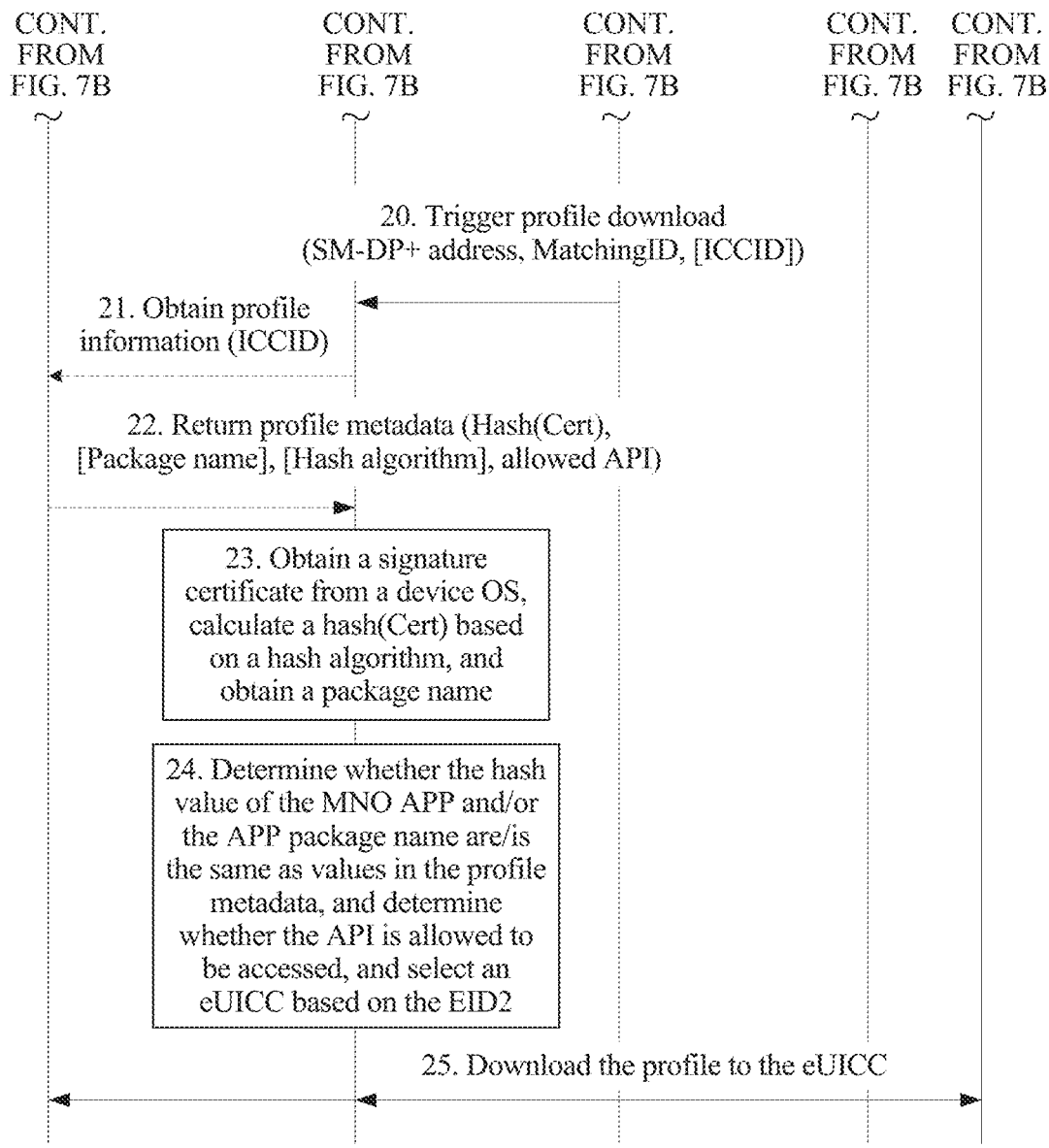

Referring to the content shown in FIG. 7A to FIG. 7C, on the basis of Embodiment 5, the second subscription profile can be downloaded to a same eUICC, that is, a single card has two different subscription profiles.

Specifically, on the basis of Embodiment 5,

In step 8, the LPA queries only an ICCID of a profile (that is, the first subscription profile) that has been installed in one eUICC.

Step 9 in Embodiment 5 is omitted. In other words, different from Embodiment 5, the LPA does not need to display the prompt information on the display screen of the device.

Step 14 and step 25 are performed by the same eUICC in step 2, step 7, step 10, and step 11.

Embodiment 8

Figure 8A:
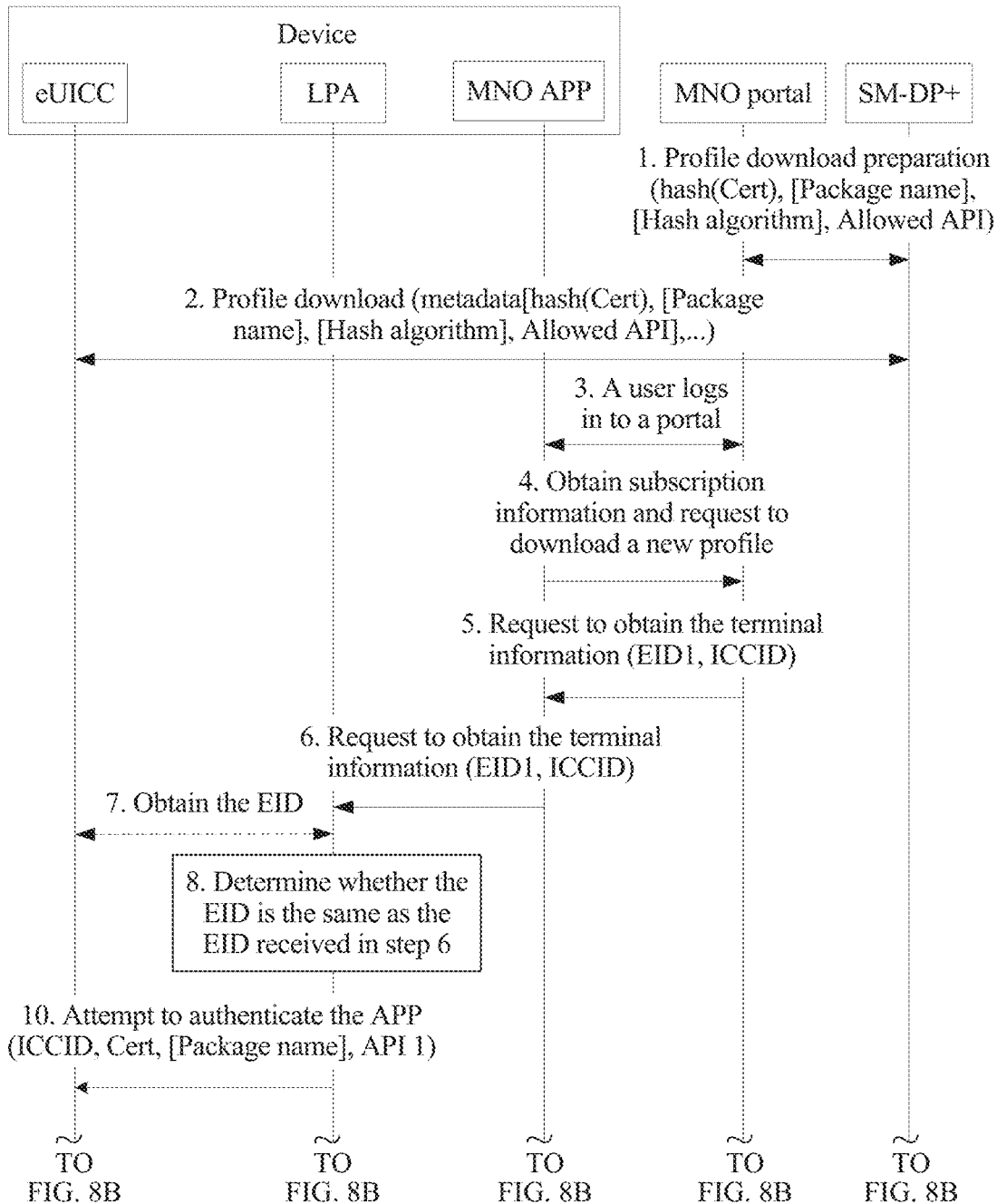
Figure 8B:
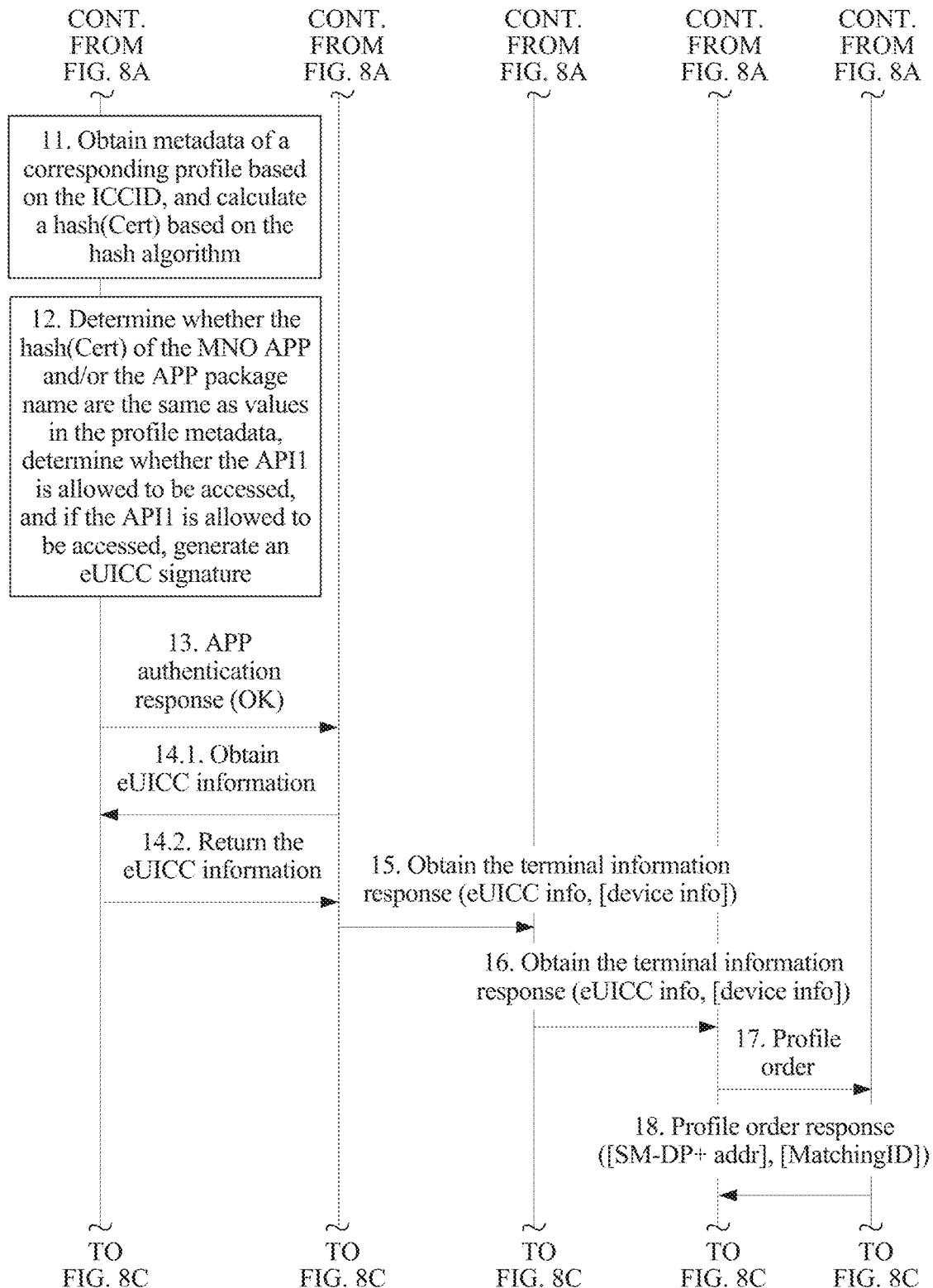
Figure 8C:
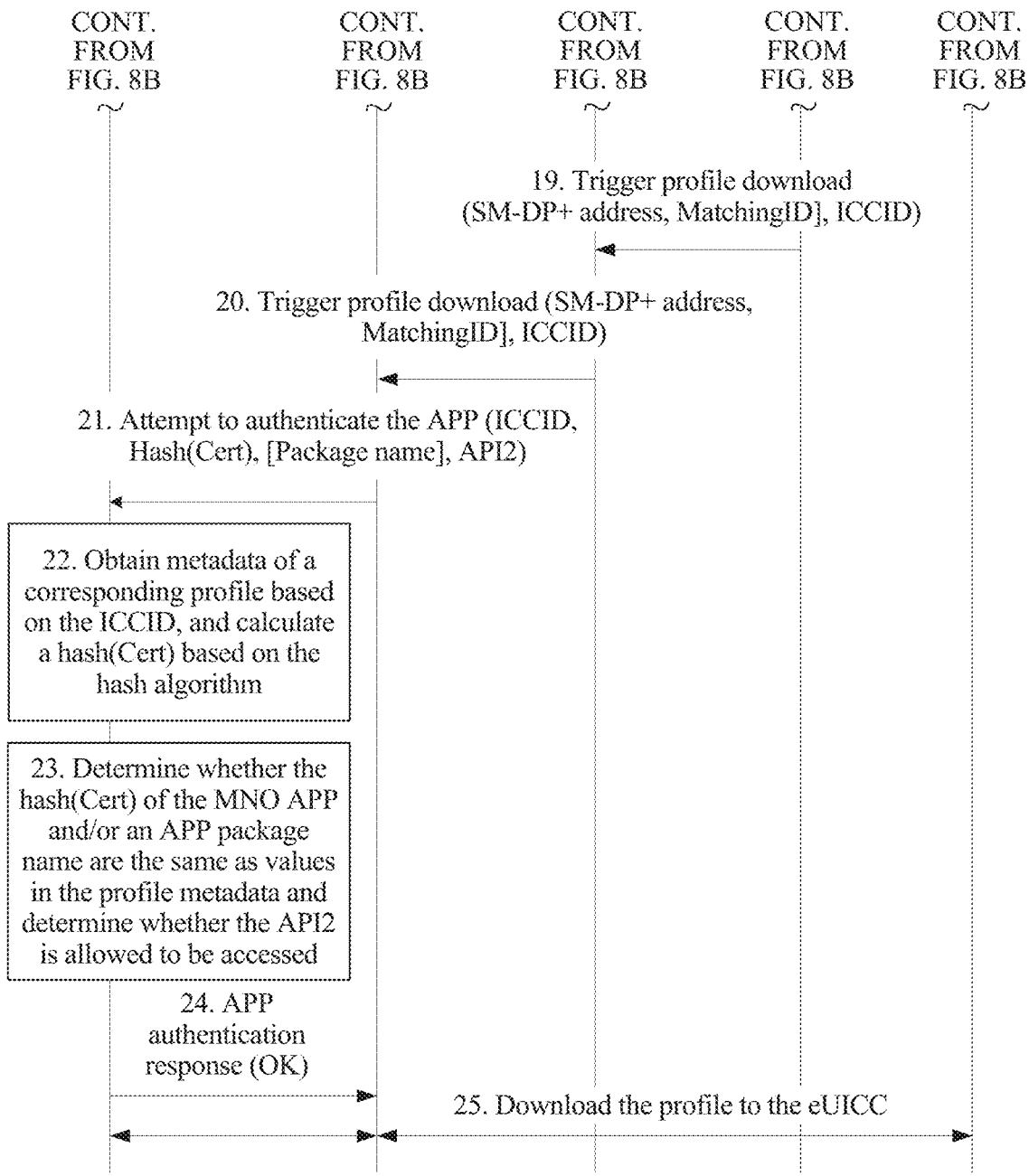

Referring to the content shown in FIG. 8A to FIG. 8C, the difference between this embodiment and Embodiment 7 is that authentication of an access permission of an APP is performed by a card (eUICC). Specifically, different from Embodiment 7, in this embodiment:

In step 10, the LPA sends an MNO APP authentication request to the eUICC, where the request carries an ICCID, a certificate of the MNO APP or a certificate chain, and a package name (Package name) of the MNO APP.

11. The eUICC obtains stored metadata of a corresponding profile based on the ICCID, and calculates a hash value (hash (Cert)) of the certificate based on a hash algorithm.
12. The eUICC determines whether the calculated hash (Cert) and the package name (package name) of the MNO APP are the same as values in the profile metadata, to determine whether an LPA API is allowed to be accessed.
13. The eUICC rectums an authentication result to the LPA, and if the authentication succeeds, steps 14.1 and 14.2 that are similar to step 14 in Embodiment 7 continue to be performed.

Compared with Embodiment 8, in this embodiment, an eUICC (that is, the eUICC) that needs to download a profile performs access control of the APP, thereby further improving security. In this embodiment, after an existing profile is downloaded, authorization information of a specific APP does not need to be preset in an eUICC that needs to download a profile, and the access control information of the APP in the profile downloaded in the eUICC can be used to perform access control.

In addition, an embodiment of the present invention provides a device. The device is used to perform the steps performed by the device in the foregoing method for installing a subscription profile. The device provided in this embodiment of the present invention may include a module corresponding to a corresponding step.

In this embodiment of the present invention functional module division may be performed on the device according to the foregoing method examples. For example, each function module can be divided for each function, or two or more functions can be integrated into one processing module. The integrated module may be implemented in a form of hardware, or may be implemented in a form of a software functional module. The division of the module in this embodiment of the present invention is an example, and is only a logical function division, and there may be another division manner in actual implementation.

Figure 9:
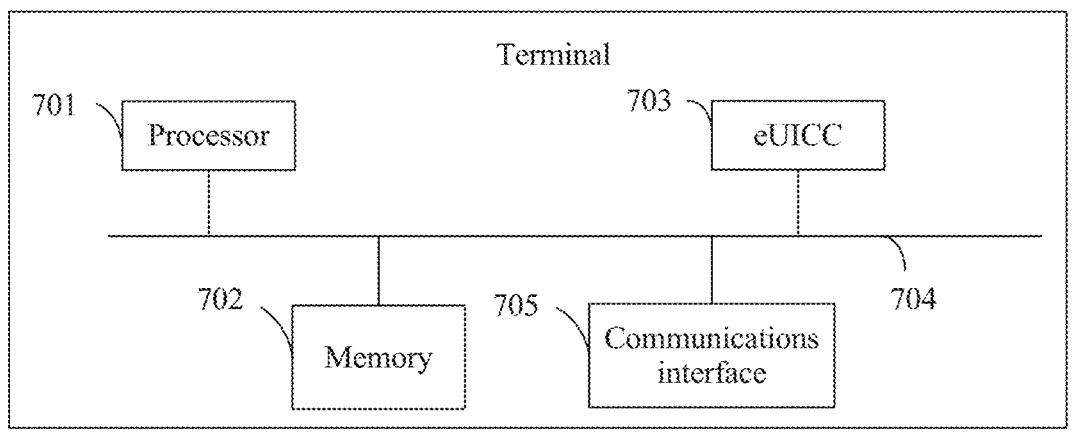
FIG. 9 is a structural block diagram of a device according to an embodiment of the present invention.

In a case in which an integrated unit is used, FIG. 9 shows a schematic diagram of a possible structure of a device in the foregoing embodiments. As shown in FIG. 9, the device includes a processor 701, a memory 702, an integrated circuit card eUICC 703, a system bus 704, and a communications interface 705. The device is configured to perform steps 101 to 106, or steps 401 to 407, or steps 501 to 506 of the methods shown in the foregoing embodiments. In addition, a computer program of an application of the device is stored in the memory 702. The processor performs corresponding computer code to perform a function of the application. The LPA also belongs to an application in the device. The device interacts with another device such as an operator server and a subscription management server by using the communications interface 705.

In a specific implementation of the present invention, the memory 702 may include a volatile memory, such as an NVRAM (Nonvolatile Random Access Memory, nonvolatile random access memory), a PRAM (Phase Change RAM, phase change RAM), or an MRAM (Magnetic Random Access Memory, magnetic random access memory). The memory 702 may further include a non-volatile memory, such as at least one magnetic disk storage device, an EEPROM (Electrically Erasable Programmable Read-Only Memory, electrically erasable programmable read-only memory), or a flash storage device such as an NOR flash memory (NOR flash memory) or an NAND flash memory (NAND flash memory). The nonvolatile memory stores an operating system and an application program that are executed by the processor. The processor 701 loads a running program and data from the non-volatile memory into a memory and stores data content in a large-capacity storage apparatus.

The processor 701 is a control center of the device. The processor 701 is connected to all the parts of the entire device by using various interfaces and lines, and perform various functions of the device and data processing by running or executing the software program and/or the application module that are/is stored in the memory 172 and by invoking data stored in the memory 702, so as to perform overall monitoring on the device.

The processor 701 may include only a CPU, or may be a combination of a CPU, a GPU (Graphic Processing Unit, graphic processing unit), a DSP, and a control chip in a communications unit (for example, a baseband chip). In an implementation of the present invention, the CPU may be a single operation core, or may include multiple operation cores.

The system bus 704 may be an ISA (Industry Standard Architecture, Industry Standard Architecture) bus, a PCI (Peripheral Component Interconnect. Peripheral Component Interconnect) bus, an EISA (Extended Industry Standard Architecture, Extended Industry Standard Architecture) bus, or the like. The system bus 704 may be classified into an address bus, a data bus, a control bus, and the like. For clarity in the embodiment of the present invention, various buses are illustrated as the system bus 704 in FIG. 9.

Figure 10:
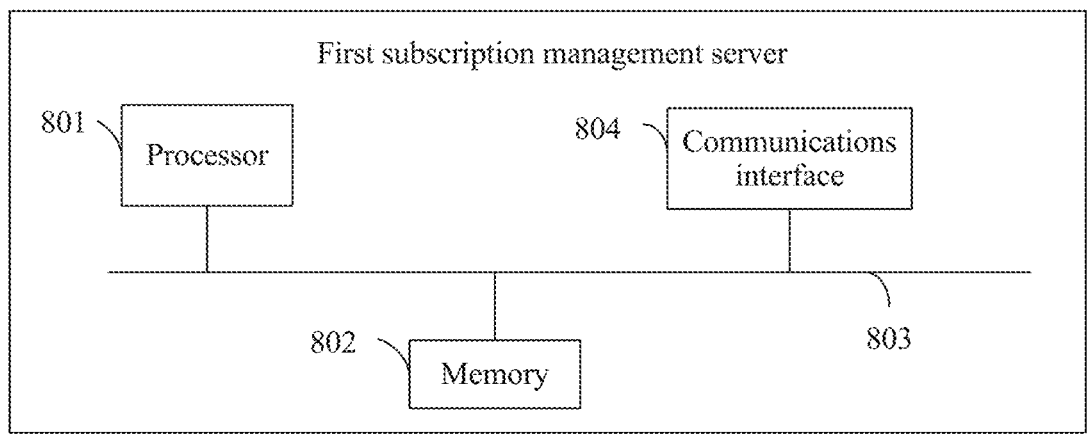
FIG. 10 is a structural block diagram of a first subscription management server according to an embodiment of the present invention.

FIG. 10 shows a schematic diagram of a possible structure of an operator server in the foregoing embodiments. As shown in FIG. 10, the operator server includes a processor

801, a memory 802, a system bus 803, and a communications interface 804. The processor 801 is configured to perform steps 201 to 204 in the foregoing embodiment. The operator server interacts with other devices such as a device and a subscription management server by using the communications interface 804.

Figure 11:
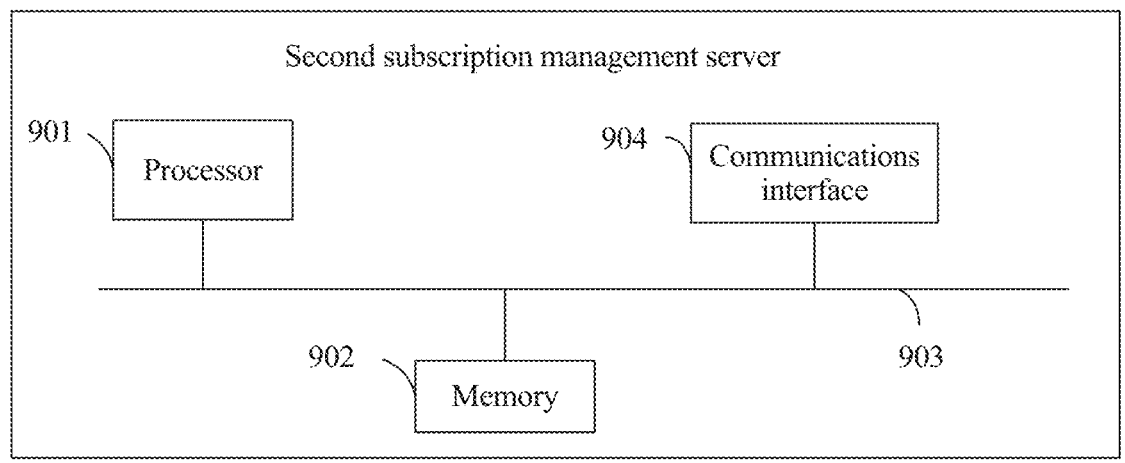
FIG. 11 is a structural block diagram of a second subscription management server according to an embodiment of the present invention.

FIG. 11 shows a schematic diagram of a possible structure of a subscription management server in the foregoing embodiments. As shown in FIG. 11, the subscription management server includes a processor 901, a memory 902, a system bus 903, and a communications interface 904. The processor 901 is configured to perform steps 301 to 306 of the method in the foregoing embodiment. The subscription management server interacts with other devices such as a device and an operator server by using the communications interface 904.

The subscription management server may also be a cloud deployment that includes a plurality of subscription management service devices, such as at least one subscription manager-data preparation device, or includes at least one subscription manager-data preparation device and at least one subscription manager-discovery service device. Each subscription manager-service device can have a processor, a memory, a system bus, and a communications interface, and the subscription manager-service devices can communicate with each other by using a network.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of a mobile device is divided into different function modules to implement all or part of the functions described above. For a detailed working process of the foregoing system, mobile device, and unit, reference may be made to a corresponding process in the foregoing method embodiments, and details are not described herein again.

In the several embodiments provided in the present invention, it should be understood that the disclosed system, mobile device, and method may be implemented in other manners. For example, the described mobile device embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the mobile devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor (processor) to perform all or a part of the steps of the methods described in the embodiments of the present invention. The foregoing storage medium includes: any medium that can store program code, such as a USB flash disk (Universal Serial Bus flash disk, universal serial bus flash disk), a removable hard disk, a ROM, a RAM, a magnetic disk, or an optical disc.

The descriptions are only specific implementations of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method, comprising:
receiving a profile order from an operator server, wherein the profile order comprises authentication information of an application allowed by the operator server to initiate subscription profile downloading and an Embedded Universal Integrated Circuit Card identification (EID), wherein the EID is identification (ID) information of an Embedded Universal Integrated Circuit Card (eUICC) in a device, and wherein the authentication information is associated with a signature certificate of the application;
returning a profile order response message to the operator server based on the profile order, wherein the profile order response message comprises an address of a subscription management server and a query ID, and wherein the query ID is a profile order matching ID or an event ID;
receiving an authentication request from the device, wherein the authentication request comprises the EID and information about the application initiating subscription profile downloading in the device;
searching, based on the EID, for the profile order matching the authentication request to obtain the authentication information from the profile order;
comparing the authentication information with the information about the application and prestored signature certificate information to authenticate the application initiating subscription profile downloading;
downloading the subscription profile for the device after the authentication succeeds;
sending an event registration request based on the profile order, wherein the event registration request comprises the authentication information;
receiving an event obtaining request from the device, wherein the event obtaining request comprises the information about the application initiating subscription profile downloading in the device;
comparing the authentication information with the information about the application initiating subscription profile downloading in the device to authenticate the application initiating subscription profile downloading; and returning an event record to the device after the authentication succeeds.

2. The method of claim 1, wherein the authentication information comprises a first certificate or a first hash value of the first certificate of the application allowed by the operator server to initiate subscription profile downloading, and wherein the information about the application comprises a second certificate or a second hash value of the second certificate of the application.

3. The method of claim 2, wherein comparing the authentication information with the information about the application comprises either:
comparing the first certificate of the application to the second certificate in the device; or
comparing the first hash value of the application to the second hash value in the device.

4. The method of claim 2, wherein the authentication information further comprises a first package name of the application allowed by the operator server to initiate subscription profile downloading, and wherein the information about the application initiating subscription profile downloading in the device further comprises a second package name of the application initiating subscription profile downloading in the device.

5. The method of claim 4, wherein comparing the authentication information with the information about the application initiating subscription profile downloading in the device further comprises comparing the first package name of the application allowed by the operator server to initiate subscription profile downloading to the second package name of the application initiating subscription profile downloading in the device.

6. An apparatus, comprising:
one or more processors;
a memory coupled to the one or more processors and configured to store a computer program, wherein the one or more processors are configured to run the computer program to configure the apparatus to:
receive a profile order from an operator server, wherein the profile order comprises authentication information of an application allowed by the operator server to initiate subscription profile downloading and an Embedded Universal Integrated Circuit Card identification (EID), wherein the EID is identification (ID) information of an Embedded Universal Integrated Circuit Card (eUICC) in a device, and wherein the authentication information is associated with a signature certificate of the application;
return a profile order response message to the operator server based on the profile order, wherein the profile order response message comprises an address of a subscription management server and a query ID, and wherein the query ID is a profile order matching ID or an event ID;
receive an authentication request from the device, wherein the authentication request comprises the EID and information about the application initiating subscription profile downloading in the device;
search, based on the EID, for the profile order matching the authentication request to obtain the authentication information from the profile order;
compare the authentication information with the information about the application initiating subscription profile downloading in the device and prestored signature certificate information to authenticate the application initiating subscription profile downloading; and
download the subscription profile for the device after the authentication succeeds;
a subscription manager-data preparation device configured to send an event registration request to a subscription manager-discovery service device based on the profile order, wherein the event registration request comprises the authentication information; and
the subscription manager-discovery service device configured to:
receive an event obtaining request from the device;
compare the authentication information with the information that is in the event obtaining request about the application initiating subscription profile downloading in the device to authenticate the application initiating subscription profile downloading; and
return an event record to the device after the authentication succeeds.

7. The apparatus of claim 6, wherein the authentication information comprises a first certificate or a first hash value of the application initiating subscription profile downloading, and wherein the information about the application initiating subscription profile downloading in the device comprises a second certificate or a second hash value in the device.

8. The apparatus of claim 7, wherein the one or more processors further configure the apparatus to:
compare the first certificate allowed by the operator server to initiate subscription profile downloading to the second certificate of the application initiating subscription profile downloading in the device; or
compare the first hash value allowed by the operator server to initiate subscription profile downloading to the second hash value of the application initiating subscription profile downloading in the device.

9. The apparatus of claim 7, wherein the authentication information further comprises a first package name of the application allowed by the operator server to initiate subscription profile downloading, and wherein the information about the application initiating subscription profile downloading in the device further comprises a second package name.

10. The apparatus of claim 9, wherein the one or more processors further configure the apparatus to compare the first package name of the application allowed by the operator server to initiate subscription profile downloading to the second package name of the application initiating subscription profile downloading in the device.

11. A computer program product comprising instructions stored on a non-transitory computer-readable medium that, when executed by one or more processors, cause an apparatus to:
receive a profile order from an operator server, wherein the profile order comprises authentication information of an application allowed by the operator server to initiate subscription profile downloading and an Embedded Universal Integrated Circuit Card identification (EID), wherein the EID is identification (ID) information of an Embedded Universal Integrated Circuit Card (eUICC) in a device, and wherein the authentication information is associated with a signature certificate of the application;
return a profile order response message to the operator server based on the profile order, wherein the profile order response message comprises an address of a subscription management server and a query ID, and wherein the query ID is a profile order matching ID or an event ID;

receive an authentication request from the device, wherein the authentication request comprises the EID and information about the application initiating subscription profile downloading in the device;

search, based on the EID, for the profile order matching the authentication request to obtain the authentication information from the profile order;

compare the authentication information with the information about the application and prestored signature certificate information to authenticate the application initiating subscription profile downloading;

download the subscription profile for the device after the authentication succeeds;

send an event registration request based on the profile order, wherein the event registration request comprises the authentication information;

receive an event obtaining request from the device, wherein the event obtaining request comprises the information about the application initiating subscription profile downloading in the device;

compare the authentication information with the information about the application initiating subscription profile downloading in the device to authenticate the application initiating subscription profile downloading; and return an event record to the device after the authentication succeeds.

12. The computer program product of claim 11, wherein the authentication information comprises a first certificate or a first hash value of the first certificate of the application allowed by the operator server to initiate subscription profile downloading, and wherein the information about the application comprises a second certificate or a second hash value of the second certificate of the application.

13. The computer program product of claim 12, wherein the one or more processors further cause the apparatus to either:

compare the first certificate of the application to the second certificate in the device; or compare the first hash value of the application to the second hash value in the device.

14. The computer program product of claim 12, wherein the authentication information further comprises a first package name of the application allowed by the operator server to initiate subscription profile downloading, and wherein the information about the application initiating subscription profile downloading in the device further comprises a second package name of the application initiating subscription profile downloading in the device.

15. The computer program product of claim 14, wherein the one or more processors further cause the apparatus to compare the first package name of the application allowed by the operator server to initiate subscription profile downloading to the second package name of the application initiating subscription profile downloading in the device.

* * * * *